(12) United States Patent
Yamada et al.

(10) Patent No.: US 12,453,199 B2
(45) Date of Patent: Oct. 21, 2025

(54) IMAGING DEVICE

(71) Applicant: Panasonic Intellectual Property Management Co., Ltd., Osaka (JP)

(72) Inventors: Shota Yamada, Shiga (JP); Yutaka Hirose, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 1024 days.

(21) Appl. No.: 17/370,012

(22) Filed: Jul. 8, 2021

(65) Prior Publication Data

US 2021/0335867 A1    Oct. 28, 2021

Related U.S. Application Data

(63) Continuation of application No. PCT/JP2020/006734, filed on Feb. 20, 2020.

(30) Foreign Application Priority Data

Mar. 20, 2019    (JP) ................... 2019-053775

(51) Int. Cl.
*H10F 39/00* (2025.01)
*H04N 25/709* (2023.01)
(Continued)

(52) U.S. Cl.
CPC ....... *H10F 39/8037* (2025.01); *H04N 25/709* (2023.01); *H10F 39/18* (2025.01);
(Continued)

(58) Field of Classification Search
None
See application file for complete search history.

(56) References Cited

U.S. PATENT DOCUMENTS

2010/0053393 A1    3/2010   Ota
2011/0216212 A1    9/2011   Watanabe et al.
(Continued)

FOREIGN PATENT DOCUMENTS

CN    102196195 A    9/2011
JP    2010-232410    10/2010
(Continued)

OTHER PUBLICATIONS

Translation of WO2018025545 (Year: 2018).*
(Continued)

*Primary Examiner* — Kretelia Graham
*Assistant Examiner* — Adin Hrnjic
(74) *Attorney, Agent, or Firm* — Rimon P.C.

(57) ABSTRACT

An imaging device includes: one or more pixels, each of the one or more pixels including a photoelectric converter including a first electrode, a second electrode, a photoelectric conversion layer that converts incident light into a signal charge, and a blocking layer; and a charge accumulation region that is coupled to the second electrode, and that accumulates the signal charge. An energy barrier of the blocking layer against migration of a charge having an opposite polarity to a polarity of the signal charge from the second electrode to the photoelectric conversion layer is larger than or equal to 1.8 eV, and an energy barrier of the blocking layer against migration of the charge from the photoelectric conversion layer to the second electrode is smaller than or equal to 1.6 eV.

10 Claims, 12 Drawing Sheets

(51) Int. Cl.
*H10F 39/18* (2025.01)
*H10K 30/30* (2023.01)

(52) U.S. Cl.
CPC ......... *H10F 39/802* (2025.01); *H10F 39/805* (2025.01); *H10K 30/353* (2023.02)

(56) References Cited

U.S. PATENT DOCUMENTS

| | | |
|---|---|---|
| 2012/0204960 A1 | 8/2012 | Kato et al. |
| 2012/0235125 A1 | 9/2012 | Forrest et al. |
| 2012/0326257 A1* | 12/2012 | Takata ................. H04N 25/633 257/432 |
| 2014/0027618 A1 | 1/2014 | Goto |
| 2014/0043510 A1 | 2/2014 | Kasuga et al. |
| 2015/0325721 A1* | 11/2015 | Toda ................. H01L 27/14614 348/294 |
| 2018/0020171 A1 | 1/2018 | Miyake et al. |
| 2018/0152652 A1* | 5/2018 | Tashiro ............... H01L 27/1461 |
| 2019/0081107 A1 | 3/2019 | Nakata et al. |
| 2019/0081251 A1 | 3/2019 | Obana et al. |

FOREIGN PATENT DOCUMENTS

| | | | |
|---|---|---|---|
| JP | 2011-119694 | 6/2011 | |
| JP | 2011-187544 | 9/2011 | |
| JP | 2018-093297 | 6/2018 | |
| WO | 2011/067878 | 6/2011 | |
| WO | 2012/132099 | 10/2012 | |
| WO | 2012/147302 | 11/2012 | |
| WO | 2017/159025 | 9/2017 | |
| WO | WO-2018025545 A1 * | 2/2018 | ........... H01L 27/146 |

OTHER PUBLICATIONS

The Extended European Search Report dated Mar. 10, 2022 for the related European Patent Application No. 20773996.2.
International Search Report of PCT application No. PCT/JP2020/006734 dated Apr. 7, 2020.
English Translation of Chinese Search Report dated Oct. 31, 2024 for the related Chinese Patent Application No. 202080006672.7.
The EPC Office Action dated Sep. 11, 2024 for the related European Patent Application No. 20773996.2.

\* cited by examiner

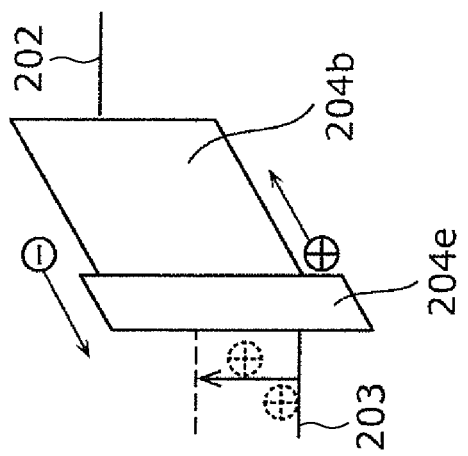
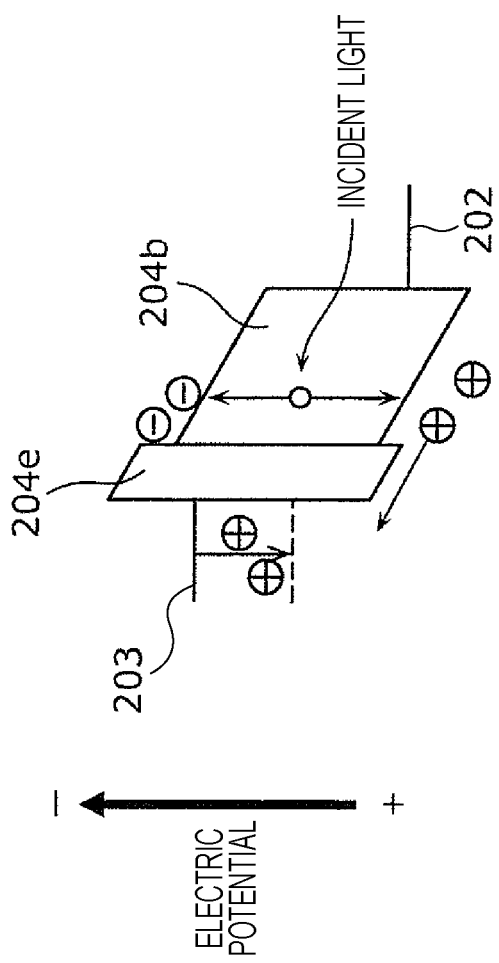
FIG. 6B
FIG. 6A

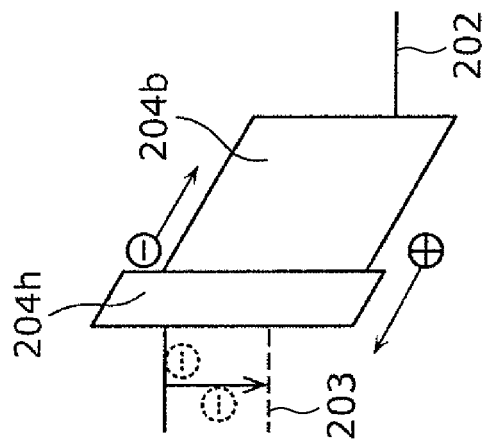
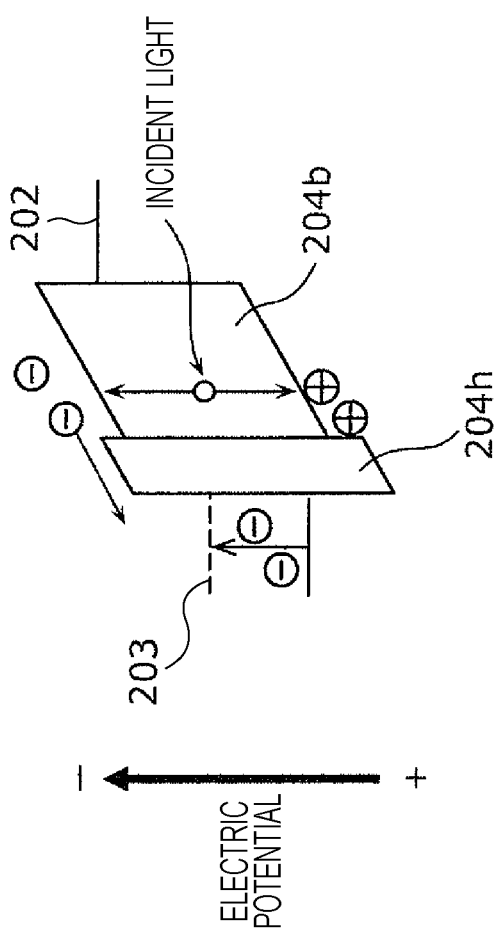

IMAGING DEVICE

BACKGROUND

1. Technical Field

The present disclosure relates to an imaging device that converts incident light into a signal charge.

2. Description of the Related Art

A demand for a solid-state imaging element that achieves a small size and a light weight in addition to image quality has been increasing in recent years along with diffusion of mobile telephones equipped with cameras, smartphones, and the like. To this end, there are a demand for reduction in chip size of an image sensor and a demand for reduction in pixel size per pixel, that is, miniaturization of pixels.

Here, focusing on a pixel structure of a typical CMOS image sensor, a silicon photodiode serving as a photoelectric conversion unit and transistors serving as a signal reading unit are provided in a section of a semiconductor substrate that corresponds to one pixel. A drive capacity may be damaged if each transistor is miniaturized into a certain level or smaller in the course of the miniaturization of the pixel. On the other hand, a proportion of area occupied by the photodiode in one pixel, or in other words, an aperture ratio is reduced if the pixel is miniaturized while retaining the size of the transistor. In this case, there is a possibility of reduction in image quality caused by reduction in sensitivity of the pixel, reduction in color reproducibility attributed to color mixing, and the like.

In view of the aforementioned problem, a function separate type CMOS image sensor prepared by forming only a signal reading unit inside a semiconductor substrate and stacking a photoelectric conversion unit made of an inorganic or organic material thereon, for example, has been disclosed in International Publication No. WO 2012/147302, and Japanese Unexamined Patent Application Publication Nos. 2011-187544 and 2018-093297.

SUMMARY

One non-limiting and exemplary embodiment provides the following configuration.

In one general aspect, the techniques disclosed here feature an imaging device including: one or more pixels, each of the one or more pixels including a photoelectric converter including a first electrode, a second electrode opposed to the first electrode, a photoelectric conversion layer that is located between the first electrode and the second electrode, and that converts incident light into a signal charge, and a blocking layer that is located between the photoelectric conversion layer and the second electrode; and a charge accumulation region that is coupled to the second electrode, and that accumulates the signal charge. An energy barrier of the blocking layer against migration of a charge having an opposite polarity to a polarity of the signal charge from the second electrode to the photoelectric conversion layer is larger than or equal to 1.8 eV, and an energy barrier of the blocking layer against migration of the charge from the photoelectric conversion layer to the second electrode is smaller than or equal to 1.6 eV.

It should be noted that general or specific embodiments may be implemented as a system, a method, an integrated circuit, a computer program, a storage medium, or any selective combination thereof.

Additional benefits and advantages of the disclosed embodiments will become apparent from the specification and drawings. The benefits and/or advantages may be individually obtained by the various embodiments and features of the specification and drawings, which need not all be provided in order to obtain one or more of such benefits and/or advantages.

BRIEF DESCRIPTION OF THE DRAWINGS

FIGS. 6A and 6B are diagrams illustrating an example of an energy band diagram of the photoelectric conversion unit of the imaging device according to Embodiment 1 of the present disclosure;

FIGS. 11A and 11B are diagrams illustrating an example of an energy band diagram of a photoelectric conversion layer of the imaging device according to the different embodiment of the present disclosure, which includes the pixels that use the electrons as the signal charges.

Figure 1:
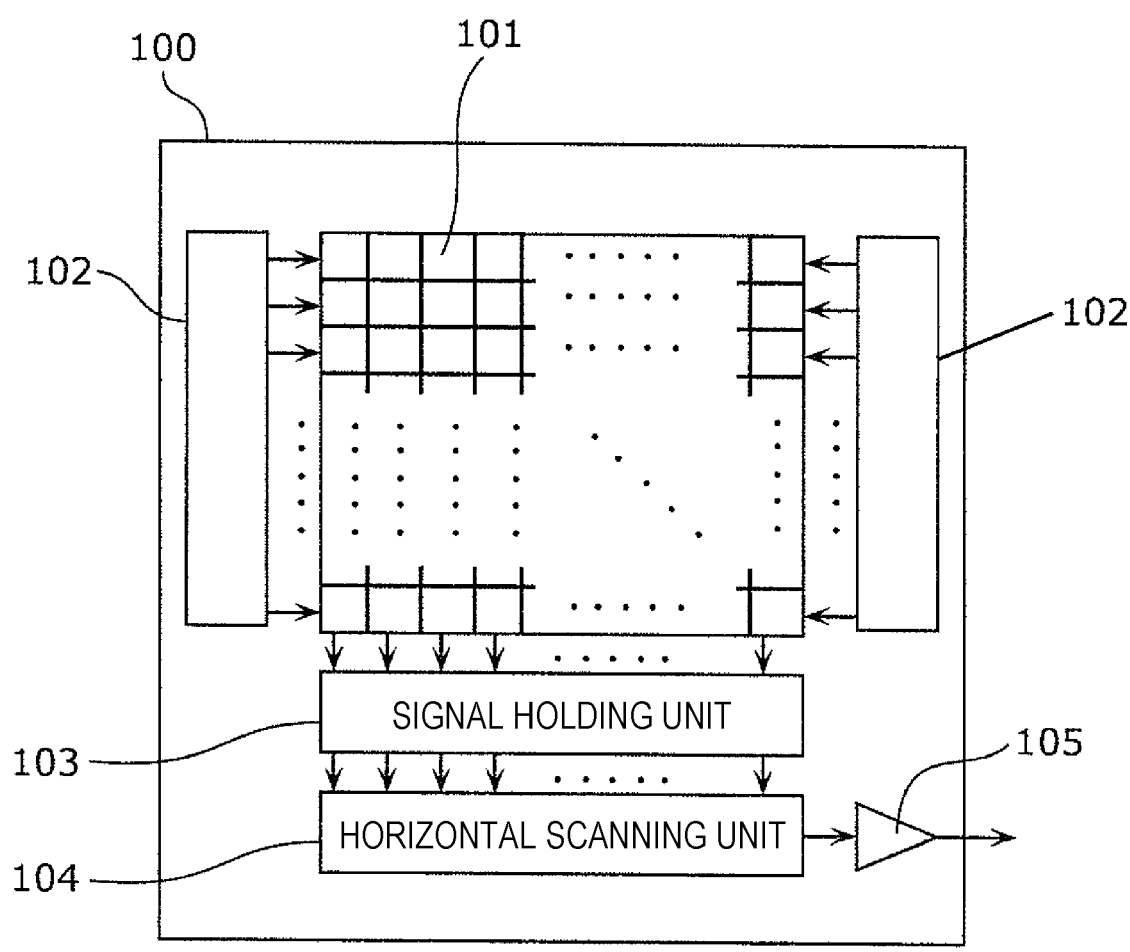
FIG. 1 is a block diagram illustrating an overall configuration of an imaging device according to Embodiment 1 of the present disclosure.

DETAILED DESCRIPTION (Knowledge Constituting Basis of Present Disclosure)

The inventors have found out that the following problems arise from the techniques disclosed in International Publication No. WO 2012/147302, and Japanese Unexamined Patent Application Publication Nos. 2011-187544 and 2018-093297.

According to the technique disclosed in International Publication No. WO 2012/147302, a pixel is formed from three transistors. It is necessary to reduce the number of the transistors in order to deal with further miniaturization. It is therefore difficult to miniaturize the pixel with according to a sensor disclosed in International Publication No. WO 2012/147302. In other words, even if the photoelectric conversion unit is formed outside the semiconductor substrate, the configuration in which the pixel includes the three transistors has a limitation of miniaturization. For example, it is difficult to miniaturize the pixel to such an extent that the pixel falls below 1 µm that is equivalent to a wavelength of light to be absorbed. Accordingly, one of the transistors has to be removed.

Meanwhile, Japanese Unexamined Patent Application Publication No. 2011-187544 proposes a technique designed to deprive a pixel of a reset transistor for resetting charges accumulated in a charge accumulation region in order to miniaturize the pixel. However, according to the technique of Japanese Unexamined Patent Application Publication No. 2011-187544, a photoelectric conversion unit has such a structure that a photoelectric conversion layer is sandwiched directly between two electrodes. For this reason, minority charges having an opposite polarity to that of signal charges may migrate from the charge accumulation region to the photoelectric conversion layer at the time of a charge accumulating operation. As a consequence, a dark current may be generated in the pixel.

In the meantime, Japanese Unexamined Patent Application Publication No. 2018-093297 proposes a technique designed to deprive a pixel of a reset transistor in order to miniaturize the pixel. Moreover, a photoelectric conversion unit includes a photoelectric conversion layer provided with a blocking layer that can block migration of minority charges. However, more countermeasures are required in order to suppress a dark current that may be generated in the pixel. In addition, this technique requires ingenuity to keep the blocking layer from blocking the migration of the minority charges from the photoelectric conversion layer to a charge accumulation region when resetting the charge accumulation region.

(Outline of Present Disclosure)

An imaging device according to one aspect of the present disclosure includes: one or more pixels, each of the one or more pixels including a photoelectric converter including a first electrode, a second electrode opposed to the first electrode, a photoelectric conversion layer that is located between the first electrode and the second electrode, and that converts incident light into a signal charge, and a blocking layer that is located between the photoelectric conversion layer and the second electrode; and a charge accumulation region that is coupled to the second electrode, and that accumulates the signal charge. An energy barrier of the blocking layer against migration of a charge having an opposite polarity to a polarity of the signal charge from the second electrode to the photoelectric conversion layer is larger than or equal to 1.8 eV, and an energy barrier of the blocking layer against migration of the charge from the photoelectric conversion layer to the second electrode is smaller than or equal to 1.6 eV.

As such, the blocking layer is included in the photoelectric converter. Moreover, the energy barrier of the blocking layer against migration of a minority charge having an opposite polarity to that of the signal charge from the second electrode to the photoelectric conversion layer is larger than or equal to 1.8 eV, and the energy barrier of the blocking layer against migration of the minority charge from the photoelectric conversion layer to the second electrode is smaller than or equal to 1.6 eV. As a consequence, it is possible to block the migration of the minority charge from the charge accumulation region to the photoelectric conversion layer with a high rate at the time of charge accumulation. This makes it possible to suppress the occurrence of a dark current. Meanwhile, the migration of the minority charge from the photoelectric conversion layer to the charge accumulation region is less likely to be hampered at the time of a resetting operation on the charge accumulation region. This makes it possible to carry out the resetting operation smoothly.

The imaging device according to one aspect of the present disclosure may further include a voltage supply circuit. The voltage supply circuit may supply a first voltage to the first electrode in a first period to accumulate the signal charge from the photoelectric converter in the charge accumulation region, and supply a second voltage being different from the first voltage to the first electrode in a second period to reset the signal charge accumulated in the charge accumulation region. Thus, a reset transistor for resetting the charge accumulation region becomes unnecessary.

Meanwhile, the signal charge may be a hole, an electron affinity of the blocking layer may be smaller than a work function of the second electrode and a difference between the electron affinity of the blocking layer and the work function of the second electrode may be larger than or equal to 1.8 eV, and the electron affinity of the blocking layer may be smaller than an electron affinity of the photoelectric conversion layer and a difference between the electron affinity of the blocking layer and the electron affinity of the photoelectric conversion layer may be smaller than or equal to 1.6 eV.

In the meantime, an ionization potential of the blocking layer may be larger than an ionization potential of the photoelectric conversion layer.

As such, in the case where the signal charge is the hole, the migration of the minority charge from the charge accumulation region to the photoelectric conversion layer is blocked with a high rate in the first period. On the other hand, the migration of the minority charge from the photoelectric conversion layer to the charge accumulation region is carried out smoothly in the second period.

Meanwhile, the imaging device according to one aspect of the present disclosure may further include a voltage supply circuit. The voltage supply circuit may supply a first voltage to the first electrode in a first period to accumulate the signal charge from the photoelectric converter in the charge accumulation region, and supply a second voltage being smaller than the first voltage to the first electrode in a second period to reset the signal charge accumulated in the charge accumulation region.

As such, in the first period, the voltage is supplied to the first electrode which is larger than the voltage to the second electrode. This makes it possible to carry out a charge accumulating operation to allow the second electrode to collect the holes generated in the photoelectric conversion layer. On the other hand, in the second period being the time of the resetting operation, the voltage is supplied to the first electrode which is smaller than the voltage to the second electrode. This makes it possible to collect the electrons at the second electrode and to reset the charge accumulation region and the second electrode.

In the meantime, the imaging device according to one aspect of the present disclosure may further include a semiconductor substrate provided with the charge accumulation region. A third voltage may be supplied to the semiconductor substrate in the first period, and a fourth voltage being different from the third voltage may be supplied to the semiconductor substrate in the second period. In this case, the third voltage may be smaller than the first voltage, and the fourth voltage may be larger than the second voltage.

As such, the different voltages are supplied to the semiconductor substrate in the first period and in the second period, respectively. This makes it possible to set the second voltage to be supplied to the first electrode in the second period to a voltage close to the first voltage as compared to the case of always supplying a constant voltage to the semiconductor substrate. As a consequence, it is possible to reduce a voltage range supplied by the voltage supply circuit as compared to the case of always supplying the constant voltage to the semiconductor substrate.

Meanwhile, the signal charge may be an electron, an ionization potential of the blocking layer may be larger than a work function of the second electrode and a difference between the ionization potential of the blocking layer and the work function of the second electrode may be larger than or equal to 1.8 eV, and the ionization potential of the blocking layer may be larger than an ionization potential of the photoelectric conversion layer and a difference between the ionization potential of the blocking layer and the ionization potential of the photoelectric conversion layer may be smaller than or equal to 1.6 eV.

In the meantime, an electron affinity of the blocking layer may be smaller than an electron affinity of the photoelectric conversion layer.

As such, in the case where the signal charge is the electron, the migration of the minority charge from the charge accumulation region to the photoelectric conversion layer is blocked with a high rate in the first period. On the other hand, the migration of the minority charge from the photoelectric conversion layer to the charge accumulation region is carried out smoothly in the second period.

Meanwhile, the imaging device according to one aspect of the present disclosure may further include a voltage supply circuit. The voltage supply circuit may supply a first voltage to the first electrode in a first period to accumulate the signal charge from the photoelectric converter in the charge accumulation region, and supply a second voltage being larger than the first voltage to the first electrode in a second period to reset the signal charge accumulated in the charge accumulation region.

As such, in the first period, the voltage is supplied to the first electrode which is smaller than the voltage to the second electrode. This makes it possible to carry out a charge accumulating operation to allow the second electrode to collect the electrons generated in the photoelectric conversion layer. On the other hand, in the second period, the voltage is supplied to the first electrode which is larger than the voltage to the second electrode. This makes it possible to collect the holes at the second electrode and to reset the charge accumulation region and the second electrode.

In the meantime, the imaging device according to one aspect of the present disclosure may further include a semiconductor substrate provided with the charge accumulation region. A fifth voltage may be supplied to the semiconductor substrate in the first period, and a sixth voltage being different from the fifth voltage may be supplied to the semiconductor substrate in the second period. In this case, the fifth voltage may be larger than the first voltage, and the sixth voltage may be smaller than the second voltage.

As such, the different voltages are supplied to the semiconductor substrate in the first period and in the second period, respectively. This makes it possible to set the second voltage to be supplied to the first electrode in the second period to a voltage close to the first voltage as compared to the case of always supplying a constant voltage to the semiconductor substrate. As a consequence, it is possible to reduce a voltage range supplied by the voltage supply circuit as compared to the case of always supplying the constant voltage to the semiconductor substrate.

Meanwhile, the photoelectric conversion layer may have a diode characteristic. The photoelectric converter may have a current voltage characteristic including a first voltage range in which an absolute value of an output current density from the photoelectric converter increases along with an increase in a bias voltage to be applied to the photoelectric conversion layer in a backward direction of the diode characteristic, a second voltage range in which the output current density increases along with an increase in the bias voltage in a forward direction of the diode characteristic, and a third voltage range located between the first voltage range and the second voltage range, an absolute value of a rate of change of the output current density relative to the bias voltage in the third voltage range being smaller than the absolute values of the rates of change in the first voltage range and the second voltage range. The bias voltage to be applied to the photoelectric conversion layer by supplying the first voltage to the first electrode may fall within the first voltage range, and the bias voltage to be applied to the photoelectric conversion layer by supplying the second voltage to the first electrode may fall within the second voltage range.

As such, the respective voltages in conformity to the current voltage characteristics of the photoelectric conversion layer having the diode characteristic are applied to the photoelectric conversion layer in the first period and the second period. Accordingly, this makes it sure to carry out the charge accumulating operation in the first period and to carry out the resetting operation in the second period.

In the meantime, the one or more pixels may include a plurality of pixels arranged in a matrix. The first electrode of each of the plurality of pixels may be continuous to each other.

As such, the first electrode is formed across all the pixels in common. As a consequence, it is possible to control a voltage to be supplied to the first electrodes of all the pixels at the same time. For example, this enables an operation to reset all the pixels at the same time, namely, a global resetting operation.

Meanwhile, the one or more pixels may include a plurality of pixels arranged in a matrix. The first electrode of each of the plurality of pixels located in a same row may be continuous to each other.

As such, the first electrode is formed in common to the pixels located on the same row. Thus, it is possible to control a voltage to be supplied to the first electrodes on the row basis, and to adjust sensitivity of the pixels on the row basis.

In the meantime, the one or more pixels may include a plurality of pixels arranged in a matrix. The first electrode of one of the plurality of pixels may be separated from the first electrode of another one of the plurality of pixels.

As such, the first electrode is formed independently for each of the pixels. This makes it possible to control a voltage to be supplied to the first electrode on the pixel basis, and to adjust sensitivity of the pixels on the pixel basis.

Meanwhile, the imaging device according to one aspect of the present disclosure may further include a semiconductor substrate. Each of the one or more pixels may include an amplification transistor including a gate coupled to the second electrode. The charge accumulation region may include the gate, and the gate may be not coupled to the semiconductor substrate.

As such, a semiconductor region in which an impurity is diffused so as to serve as the charge accumulation region becomes unnecessary. As a consequence, it is possible to further miniaturize the pixels.

Embodiments of an imaging device according to the present disclosure will be described below with reference to the drawings. Note that each of embodiments described below represents a mere specific example. Accordingly, numerical values, shapes, materials, constituents, and layouts as well as modes of coupling the constituents disclosed in the following embodiments are mere instances and these features are not intended to limit the present disclosure. As a consequence, of the constituents in the following embodiments, the constituents which are not defined in the independent claim representing the most superordinate concept are described as optional constituents. In the meantime, the respective drawings are schematic drawings which do not always illustrate details exactly. It is to be also noted that the same components in the drawings are denoted by the same reference signs.

Meanwhile, various elements illustrated in the drawings are merely schematic representations made for the understanding of the present disclosure, and dimensional ratios, external appearance, and the like therein may be different from reality. In other words, the drawings are schematic drawings which do not always contain exact illustrations. As a consequence, reduction scales and the like do not always agree among the drawings. In addition, each numerical value range in the present specification is not an expression that represents only a strict meaning but is an expression that means a substantially equivalent range such as a range including an allowance around several percent.

In the meantime, in the description of structures in this specification, terms "upper" and "lower" do not represent an upper direction (vertically upward) and a lower direction (vertically downward) in absolute space recognition, but are used as terms to be defined by a relative positional relationship based on an stacking order in a laminate structure. To be more precise, a light receiving side of an imaging device is defined as an "upper" side while an opposite side to the light receiving side is defined as a "lower" side. In addition, the terms "upper" and "lower" are applicable not only to a case where two constituents are arranged with a space in between and another constituent is present between the two constituents mentioned above, but also to a case where the two constituents are arranged in close contact with each other and the two constituents adhere to each other.

Embodiment 1

First, an overall configuration of an imaging device according to Embodiment 1 of the present disclosure will be described by using FIGS. 1 to 3.

FIG. 1 is a block diagram illustrating an overall configuration of an imaging device according to Embodiment 1. An imaging device 100 illustrated in FIG. 1 includes a pixel array unit 101, a vertical scanning unit 102, a signal holding unit 103, a horizontal scanning unit 104, and an output stage amplifier circuit unit 105. Moreover, vertical signal lines are arranged at the pixel array unit 101 and in a surrounding region thereof corresponding to respective pixel columns and scanning lines are arranged corresponding to respective pixel rows.

The pixel array unit 101 is an imaging unit in which multiple pixels 200 are arranged in a matrix of m rows and n columns (each of m and n is a natural number), for example.

The vertical scanning unit 102 has a function to control a resetting operation of the pixels 200, a charge accumulating operation, and a reading operation on the row basis.

The signal holding unit 103 is a signal holding unit that holds a difference signal between a pixel signal outputted from each pixel 200 and a reset signal corresponding to the pixel 200, and outputs the difference signal in accordance with an instruction of the horizontal scanning unit 104 to be described below.

The horizontal scanning unit 104 has functions to sequentially select the difference signals for one row held by the signal holding unit 103 and to read out and store the difference signals in the output stage amplifier circuit unit 105 located on an output side of the signal holding unit 103.

Figure 2:
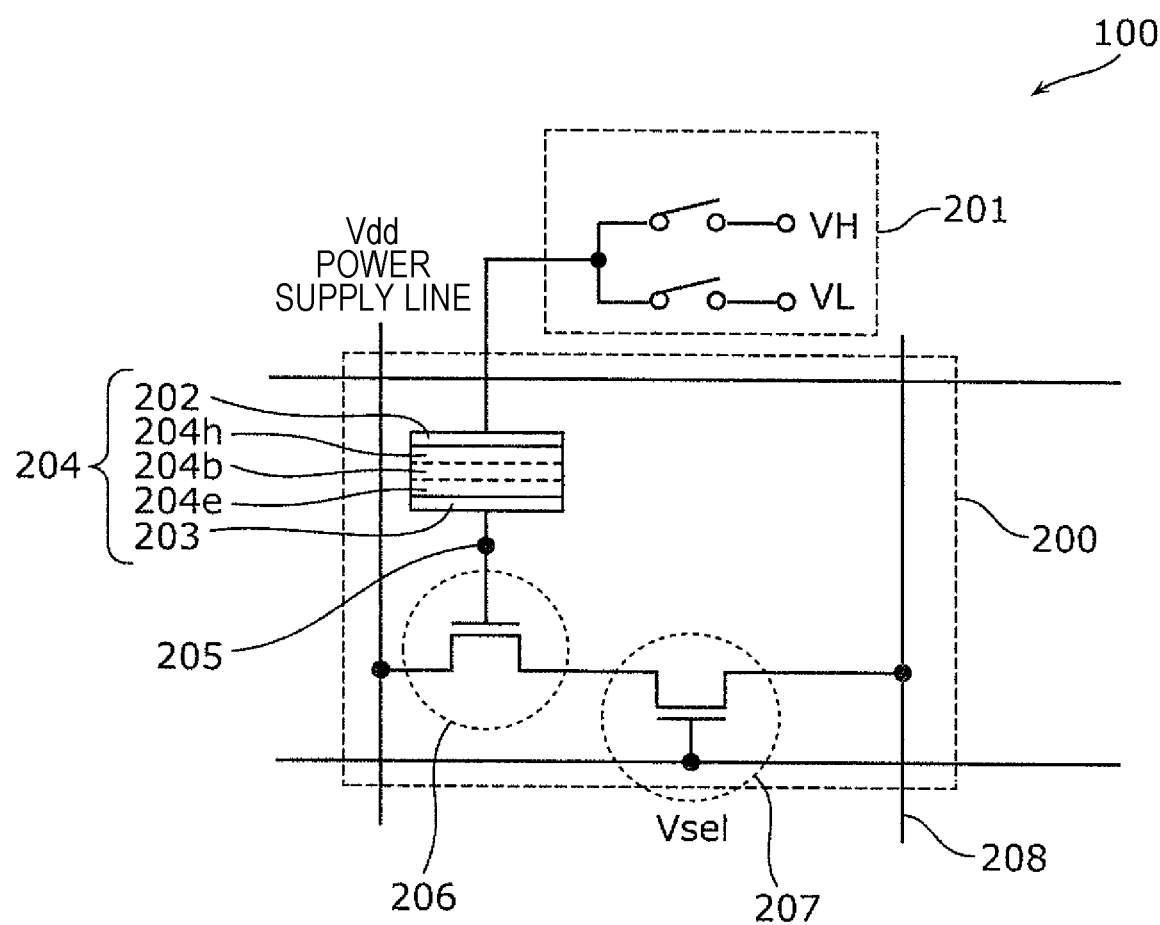
FIG. 2 is a diagram illustrating an example of a circuit configuration of a pixel and a voltage supply circuit of the imaging device according to Embodiment 1 of the present disclosure.

FIG. 2 is a diagram illustrating an example of a circuit configuration of a pixel 200 and a voltage supply circuit 201 of the imaging device 100 according to Embodiment 1. FIG. 2 illustrates a specific circuit configuration example of the pixel 200, the voltage supply circuit 201, a power supply line, and respective signal lines.

The pixel 200 includes a photoelectric conversion unit 204, a charge accumulation unit (floating diffusion) 205, an amplification transistor 206, and a selection transistor 207. In other words, a conventionally required reset transistor is removed therefrom.

The photoelectric conversion unit 204 generates signal charges corresponding to an amount of incident light by subjecting the incident light to photoelectric conversion. To be more precise, the photoelectric conversion unit 204 is formed from a first electrode 202, a second electrode 203, a photoelectric conversion layer 204b which is an active layer sandwiched between the electrodes, a hole blocking layer 204h sandwiched between the first electrode 202 and the photoelectric conversion layer 204b, and an electron blocking layer 204e sandwiched between the photoelectric conversion layer 204b and the second electrode 203. The photoelectric conversion layer 204b includes organic molecules having a high light absorptive capacity, for example. The photoelectric conversion layer 204b has a thickness of about 500 nm, for instance. In the meantime, the photoelectric conversion layer 204b is formed by using a vacuum vapor deposition method, for example. The organic molecules have the high light absorptive capacity across the entire visible light range of wavelengths from about 400 nm to about 700 nm. Details of the photoelectric conversion unit 204 will be described later in detail by using FIG. 4.

Note that the photoelectric conversion unit 204 included in the pixel 200 according to this embodiment is not limited to the configuration formed from the aforementioned organic photoelectric conversion film, but may be a photodiode made of an inorganic material, for example. Meanwhile, the light absorbable wavelengths are not limited to the visible light range but may be a waveband obtained by an infrared range, an ultraviolet range, or a combination thereof.

The charge accumulation unit 205 is coupled to the second electrode 203 of the photoelectric conversion unit 204, thus forming a charge accumulation region for accumulating the signal charges generated by the photoelectric conversion. Here, the charge accumulation region is formed not only from the charge accumulation unit 205 but also from wiring coupled to the second electrode 203 and floating capacitance provided to a gate of the amplification transistor 206. Therefore, the charge accumulation region does not have to include the charge accumulation unit 205 formed from extrinsic semiconductor as described later. In other words, the charge accumulation region may be a region such as the gate of the amplification transistor 206, which is not coupled to the semiconductor substrate.

Each of the amplification transistor 206 and the selection transistor 207 is typically a field effect transistor (FET). In the following, a description will be given of an example of using an n-channel MOSFET (metal oxide semiconductor FET) as each transistor unless otherwise specified. Here, the polarity of the FET and the level of electric potential at each point of time determine which one of two diffusion regions of the FET corresponds to a source or a drain. For this reason, an operating condition of the FET may change which one serves as the source or the drain.

In the amplification transistor 206, its gate is coupled to the charge accumulation unit 205 and a power supply voltage Vdd is supplied to its drain terminal. Thus, the amplification transistor 206 outputs a pixel signal corresponding to a charge amount of the single charges accumulated in the charge accumulation region.

In the selection transistor 207, its drain terminal is coupled to a source terminal of the amplification transistor 206 and its source terminal is coupled to a vertical signal line 208. Thus, the selection transistor 207 determines a timing to output the pixel signal from the amplification transistor 206.

The voltage supply circuit 201 has two reference electric potentials and is capable of selecting one of the reference electric potentials and inputting the selected reference electric potential to the first electrode 202. The two reference electric potentials include a voltage VH and a voltage VL. Details of the signal accumulation and the resetting operation by this voltage supply circuit 201 will be described later by using FIG. 4. The voltage VH and the voltage VL are examples of a first voltage to be applied to the first electrode 202 and a second voltage that is different from the first voltage, respectively. In this embodiment, the voltage VH is larger than the voltage VL. For example, the voltage VH is 8 V while the voltage VL is −2 V. In this specification, "large" and "small" voltages mean "higher" and "lower" electric potentials, respectively. For example, the voltage "1 V" is larger than the voltage "−2 V".

Figure 3:
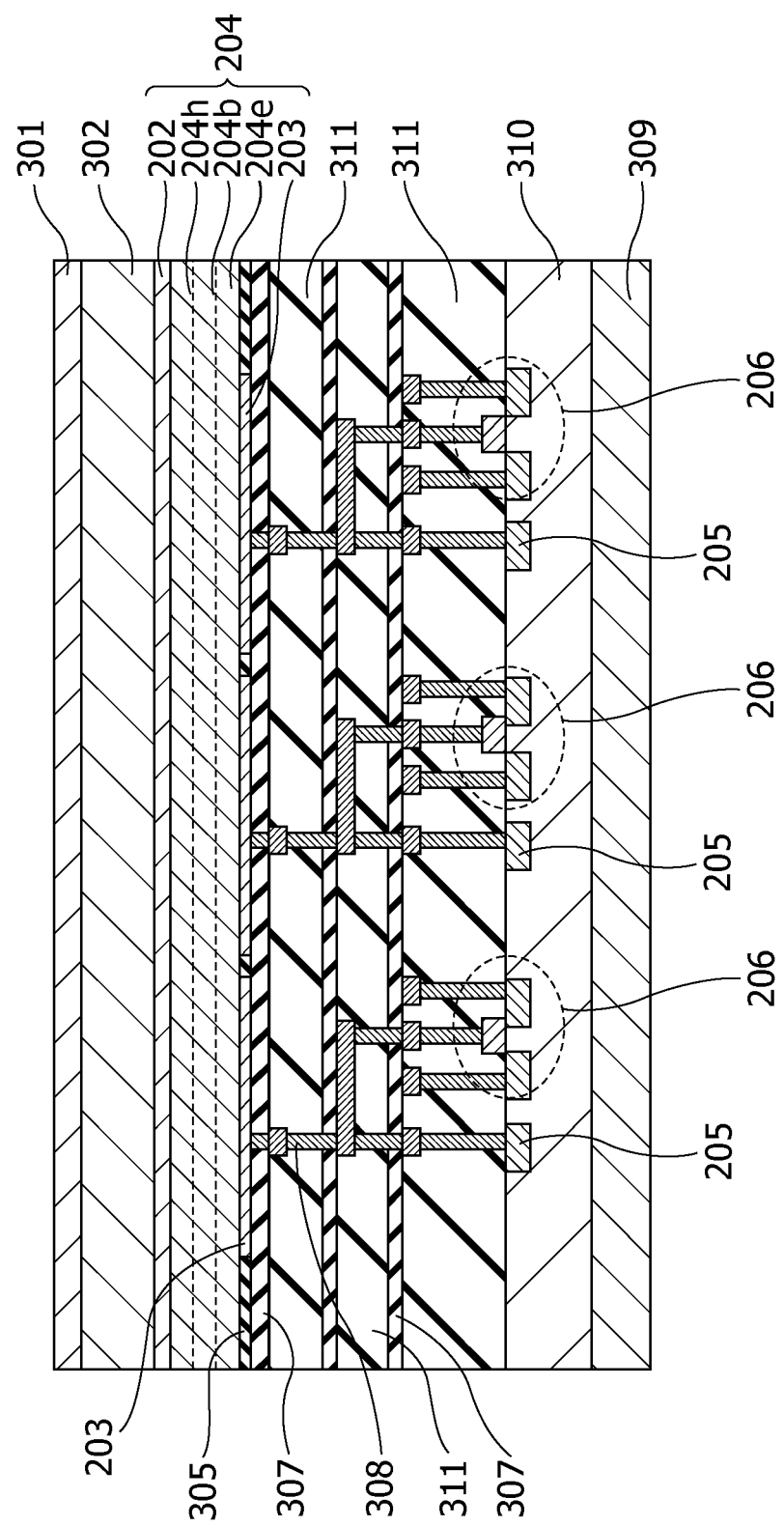
FIG. 3 is a diagram illustrating an example of a cross-sectional view equivalent to three pixels in the imaging device according to Embodiment 1 of the present disclosure.

FIG. 3 is a diagram illustrating an example of a cross-sectional view of a region equivalent to three pixels in the imaging device 100. As for the actual pixels, ten million pixels are arranged on the pixel array unit 101, for example.

As illustrated in FIG. 3, the imaging device 100 includes a color filter 301, a protection film 302, the photoelectric conversion unit 204, inter-electrode insulating films 305, inter-wiring insulating films 307, a wiring layer 308, a substrate 309, a well 310, and interlayer insulating films 311. The photoelectric conversion unit 204 includes the first electrode 202, the hole blocking layer 204h, the photoelectric conversion layer 204b, the electron blocking layer 204e, and the second electrodes 203.

The substrate 309 is a semiconductor substrate such as a silicon substrate.

The first electrode 202 is a conductive transparent electrode that is formed below the protection film 302 and across the entire surface of the pixel array in this embodiment. This first electrode 202 allows the light to pass through. For instance, the first electrode 202 is made of ITO (indium tin oxide).

The second electrodes 203 are arranged above the substrate 309 in a matrix fashion. Moreover, the second electrodes 203 are electrically separated from one another. To be more precise, the second electrodes 203 are formed between the inter-electrode insulating films 305 and designed to collect holes which are the signal charges generated in the photoelectric conversion layer 204b. These second electrodes 203 are made of TiN, for example. In the meantime, the second electrodes 203 are formed on the planarized inter-wiring insulating film 307 having a thickness of 100 nm, for example.

Meanwhile, the respective second electrodes 203 are separated from one another at an interval of 0.2 μm, for example. Moreover, the inter-electrode insulating films 305 are embedded in these separating regions as well.

The wiring layer 308 is coupled to the charge accumulation units 205 and to gate terminals of the amplification transistors 206. All of the selection transistors 207, though not illustrated, and the charge accumulation units 205 provided in the same pixels are formed in the same p-type well 310. In the meantime, this well 310 is formed in the substrate 309. In other words, signal reading circuits each formed from the amplification transistor 206 and the selection transistor 207 illustrated in FIG. 2 are formed on the substrate 309, and read signals corresponding to the signal charges are generated by detecting changes in current or voltage that occur in the respective second electrodes 203. Meanwhile, the amplification transistors 206 generate read signals by amplifying the changes in current or voltage that occur in the second electrodes 203.

As described above, according to the imaging device 100 of this embodiment, the signal charges being any of positive and negative charges generated by the photoelectric conversion can be collected with the second electrodes 203 by irradiating the photoelectric conversion layer 204b with light and applying a bias voltage between each first electrode 202 and the corresponding second electrode 203, thereby accumulating the collected signal charges in the charge accumulation region. The inventors of the present disclosure have found out that the signal charges that have already been accumulated in the charge accumulation region can be drawn out to the first electrode 202 through the photoelectric conversion layer 204b by using the photoelectric conversion layer 204b having current voltage characteristics to be described below and reversing a potential difference between the first electrode 202 and each second electrode 203 from that at the time of the charge accumulating operation. In other words, the inventors have found out that the signal charge resetting function can be realized by controlling the magnitude of the bias voltage to be applied to the photoelectric conversion layer 204b without providing each of the pixels with an individual element such as a reset transistor. A typical example of operations with the imaging device 100 will be described later.

An example of a configuration of the photoelectric conversion layer 204b and the current voltage characteristics of the photoelectric conversion layer 204b will be described below.

The photoelectric conversion layer 204b typically includes a semiconductor material. Here, an organic semiconductor material is used as the semiconductor material. The photoelectric conversion layer 204b includes, for example, tin naphthalocyanine represented by general formula (1) below (hereinafter simply referred to as "the tin naphthalocyanine" when appropriate).

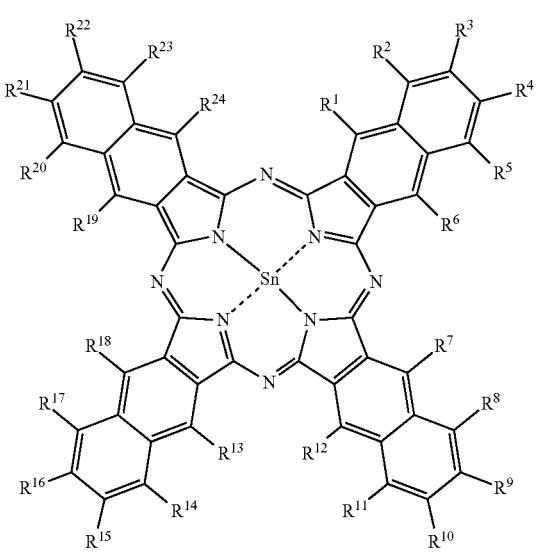

(1)

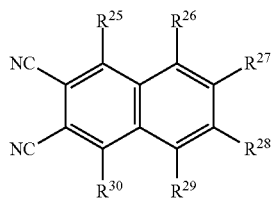

(2)

In the tin naphthalocyanine represented by general formula (1) mentioned above, it is advantageous that 8 or more of the codes $R^1$ to $R^{24}$ are hydrogen atoms or deuterium atoms, it is more advantageous that 16 or more of the codes $R^1$ to $R^{24}$ are hydrogen atoms or deuterium atoms, and it is even more advantageous that all of the codes $R^1$ to $R^{24}$ are hydrogen atoms or deuterium atoms from the viewpoint of ease of controlling a state of cohesion of molecules. Moreover, tin naphthalocyanine represented by formula (3) below is advantageous in terms of ease of synthesis.

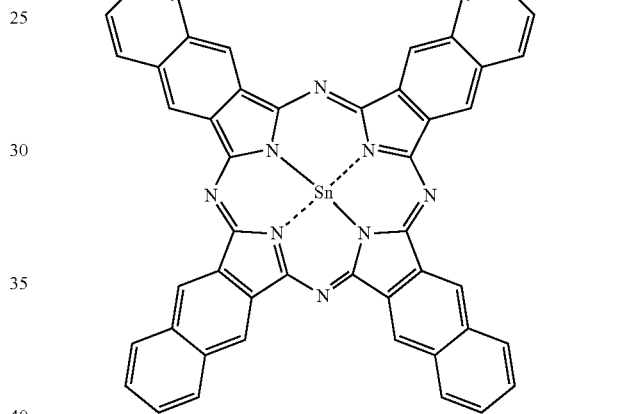

(3)

In general formula (1), codes $R^1$ to $R^{24}$ each independently represent a hydrogen atom or a substituent group. The substituent group is not limited to a specific substituent group and may be any of a deuterium atom, a halogen atom, an alkyl group (including a cycloalkyl group, a bicycloalkyl group, and a tricycloalkyl group), an alkenyl group (including a cycloalkenyl group and a bicycloalkenyl group), an alkynyl group, an aryl group, a heterocyclic group (which may be also referred to as a hetero ring group), a cyano group, a hydroxy group, a nitro group, a carboxy group, an alkoxy group, an aryloxy group, a silyloxy group, a heterocyclic oxy group, an acyloxy group, a carbamoyloxy group, an alkoxycarbonyloxy group, an aryloxycarbonyloxy group, an amino group (including an anilino group), an ammonio group, an acylamino group, an aminocarbonylamino group, an alkoxycarbonylamino group, an aryloxycarbonylamino group, a sulfamoylamino group, an alkylsulfonylamino group, an arylsulfonylamino group, a mercapto group, an alkylthio group, an arylthio group, a heterocyclic thio group, a sulfamoyl group, a sulfo group, an alkylsulfinyl group, an arylsulfinyl group, an alkylsulfonyl group, an arylsulfonyl group, an acyl group, an aryloxycarbonyl group, an alkoxycarbonyl group, a carbamoyl group, an arylazo group, a heterocyclic azo group, an imido group, a phosphino group, a phosphinyl group, a phosphinyloxy group, a phosphinylamino group, a phosphono group, a silyl group, a hydrazino group, a ureide group, a boronic acid group (—B(OH)$_2$), a phosphate group (—OPO(OH)$_2$), a sulfate group (—OSO$_3$H), and other known substituent groups.

A commercially available product can be used as the tin naphthalocyanine represented by the above general formula (1). Alternatively, the tin naphthalocyanine represented by general formula (1) mentioned above may be synthesized, for example, by using a naphthalene derivative represented by general formula (2) below as a starting material as disclosed in Japanese Unexamined Patent Application Publication No. 2010-232410. Codes $R^{25}$ to $R^{30}$ in general formula (2) may be the same substituent groups as the codes $R^1$ to $R^{24}$ in general formula (1).

The tin naphthalocyanine represented by general formula (1) mentioned above absorbs light in a wavelength band roughly more than or equal to 200 nm and less than or equal to 1100 nm. For example, the tin naphthalocyanine represented by formula (3) above has an absorption peak at a position of a wavelength of about 870 nm. That is to say, it is possible to realize an optical sensor that can detect near-infrared rays, for example, by selecting a material containing the tin naphthalocyanine as a material that forms the photoelectric conversion layer 204b.

Figure 4:
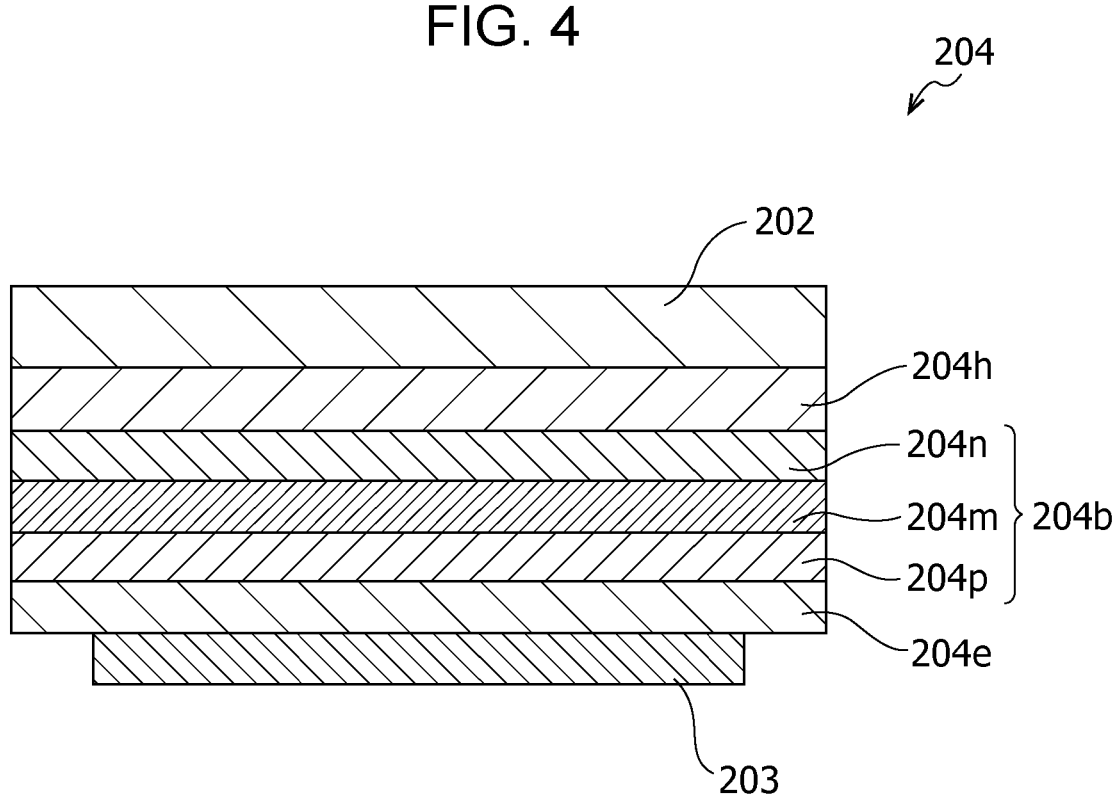
FIG. 4 is a diagram schematically illustrating an example of a detailed configuration of a photoelectric conversion unit of the imaging device according to Embodiment 1 of the present disclosure.

FIG. 4 schematically illustrates an example of a detailed structure of the photoelectric conversion unit 204. In the exemplary structure illustrated in FIG. 4, the photoelectric conversion unit 204 includes the first electrode 202, the hole blocking layer 204h, the photoelectric conversion layer 204b formed by using the organic semiconductor material containing the tin naphthalocyanine represented by general formula (1) mentioned above and designed to convert the incident light into the signal charges, the electron blocking layer 204e, and the second electrode 203. The hole blocking layer 204h is arranged between the photoelectric conversion layer 204b and the first electrode 202. The electron blocking layer 204e is arranged between the photoelectric conversion layer 204b and the second electrode 203.

The photoelectric conversion layer 204b illustrated in FIG. 4 includes at least one of p-type semiconductor or n-type semiconductor. In the exemplary structure illustrated in FIG. 4, the photoelectric conversion layer 204b includes a p-type semiconductor layer 204p, an n-type semiconductor layer 204n, and a mixed layer 204m sandwiched between the p-type semiconductor layer 204p and the n-type semiconductor layer 204n. In other words, the photoelectric conversion layer 204b has a diode characteristic. The p-type semiconductor layer 204p is arranged between the electron blocking layer 204e and the mixed layer 204m and has a function for photoelectric conversion and/or hole transport. The n-type semiconductor layer 204n is arranged between the hole blocking layer 204h and the mixed layer 204m and has a function for photoelectric conversion and/or electron transport. As described later, the mixed layer 204m may include at least one of the p-type semiconductor or the n-type semiconductor. The p-type semiconductor layer 204p includes organic p-type semiconductor and the n-type semiconductor layer 204n includes organic n-type semiconductor. In other words, the photoelectric conversion layer 204b includes the organic photoelectric conversion material containing the tin naphthalocyanine represented by general formula (1) mentioned above, and at least one of the organic p-type semiconductor or the organic n-type semiconductor.

The p-type organic semiconductor compound is a donor-type organic semiconductor compound, which refers to an organic compound represented mainly by a hole-transporting organic compound that is prone to donate electrons. To be more precise, in the case where two organic materials are used while bringing the materials into contact with each other, the organic p-type semiconductor compound refers to the organic compound having a smaller ionization potential. Thus, the donor-type organic compound may apply any organic compound as long as it is an organic compound having an electron-donating property. Examples of such an applicable organic compound include triarylamine compounds, benzidine compounds, pyrazoline compounds, styrylamine compounds, hydrazone compounds, triphenylmethane compounds, carbazole compounds, polysilane compounds, thiophene compounds, phthalocyanine compounds, cyanine compounds, merocyanine compounds, oxonol compounds, polyamine compounds, indole compounds, pyrrole compounds, pyrazole compounds, polyarylene compounds, condensed aromatic carbocyclic compounds (such as naphthalene derivatives, anthracene derivatives, phenanthrene derivatives, tetracene derivatives, pyrene derivatives, perylene derivatives, and fluoranthene derivatives), and metal complexes including a nitrogen-containing heterocyclic compound as a ligand. Examples of the donor-type organic semiconductor are not limited to these substances. As described above, any organic compound having a smaller ionization potential than an organic compound used as an n-type (acceptor-type) compound may be used as the donor-type organic semiconductor. The above-described tin naphthalocyanine is an example of the organic p-type semiconductor material.

The n-type organic semiconductor compound is an acceptor-type organic semiconductor compound, which refers to an organic compound represented mainly by an electron-transporting organic compound that is prone to accept electrons. To be more precise, in the case where two organic materials are used while bringing the materials into contact with each other, the organic n-type semiconductor compound refers to the organic compound having a larger electron affinity. Thus, the acceptor-type organic compound may apply any organic compound as long as it has an electron-accepting property. Examples of such an applicable organic compound include fullerene, fullerene derivatives, condensed aromatic carboncyclic compounds (such as naphthalene derivatives, anthracene derivatives, phenanthrene derivatives, tetracene derivatives, pyrene derivatives, perylene derivatives, and fluoranthene derivatives), five to seven-membered heterocyclic compounds containing a nitrogen atom, an oxygen atom, or a sulfur atom (such as pyridine, pyradine, pyrimidine, pyridadine, triazine, quinoline, quinoxaline, quinazoline, phthalazine, cinnoline, isoquinoline, pteridine, acridine, phenazine, phenanthroline, tetrazole, pyrazole, imidazole, thiazole, oxazole, indazole, benzimidazole, benzotriazole, benzoxazole, benzothiazole, carbazole, purine, triazolopyridadine, triazolopyrimidine, tetrazaindene, oxadiazole, imidazopyridine, pyrrolidine, pyrrolopyridine, thiadiazolopyridine, dibenzazepine, and tribenzazepine), polyarylene compounds, fluorine compounds, cyclopentadiene compounds, silyl compounds, and metal complexes including a nitrogen-containing heterocyclic compound as a ligand. Examples of the acceptor-type organic semiconductor are not limited to these substances. As described above, any organic compound having a larger electron affinity than an organic compound used as the p-type compound, or in other words, the donor-type organic compound may be used as the acceptor-type organic semiconductor.

The mixed layer 204m may be a layer having a bulk heterojunction structure including p-type semiconductor and n-type semiconductor, for example. In a case of forming the mixed layer 204m as a layer including the bulk heterojunction structure, the tin naphthalocyanine represented by general formula (1) mentioned above may be used as the p-type semiconductor material, and fullerene and/or a fullerene derivative may be used as the n-type semiconductor material. The material forming the p-type semiconductor layer 204p may be the same p-type semiconductor material included in the mixed layer 204m. Likewise, the material forming the n-type semiconductor layer 204n may be the same n-type semiconductor material included in the mixed layer 204m. The bulk heterojunction structure is described in detail in Japanese Patent No. 5553727. For the purpose of reference, the entire contents of Japanese Patent No. 5553727 are incorporated herein.

By using materials appropriate to a wavelength band targeted for detection, it is possible to realize an imaging device having sensitivity in the desired wavelength band. The photoelectric conversion layer 204b may include an inorganic semiconductor material such as amorphous silicon. The photoelectric conversion layer 204b may include a layer made of an organic material and a layer made of an inorganic material. In the following, a description will be given of an example in which the bulk heterojunction structure obtained by codeposition of tin naphthalocyanine and C60 is applied to the photoelectric conversion layer 204b.

Note that in this embodiment, the electron affinity of the electron blocking layer 204e is smaller by at least 1.8 eV than a work function of the second electrode 203 and is smaller by not more than 1.6 eV than the electron affinity of the photoelectric conversion layer 204b. Meanwhile, the ionization potential of the electron blocking layer 204e is larger than the ionization potential of the photoelectric conversion layer 204b. For example, a combination of the materials of the second electrode 203, the electron blocking layer 204e, and the photoelectric conversion layer 204b that satisfies the aforementioned conditions is a combination of TiN, α-NPD (4,4'-bis[N-(naphthyl)-N-phenyl-amino]biphenyl), and fullerene C60, respectively. The work function of the TiN is 4.7 eV, the electron affinity of the α-NPD is 2.4 eV, and the electron affinity of the fullerene C60 is 4.0 eV.

(Current Voltage Characteristics of Photoelectric Conversion Layer)

Figure 5:
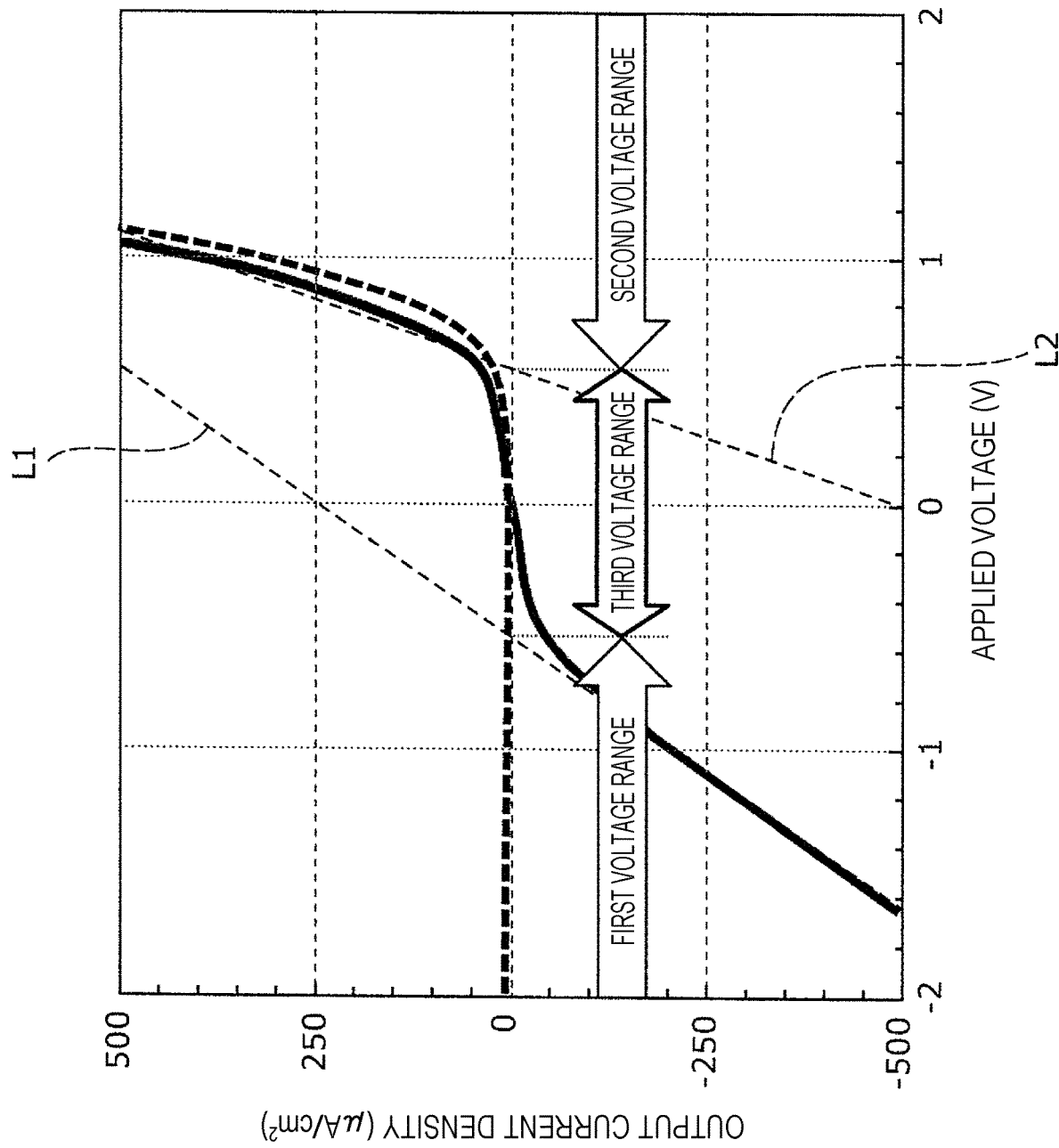
FIG. 5 is a diagram illustrating an example of typical current voltage characteristics provided to a photoelectric conversion layer of the imaging device according to Embodiment 1 of the present disclosure.

FIG. 5 is a diagram illustrating an example of typical current voltage characteristics provided to the photoelectric conversion layer 204b. The horizontal axis therein indicates an applied voltage (V) to the photoelectric conversion layer 204b and the vertical axis therein indicates an output current density ($\mu A/cm^2$) that represents a density of an electric current flowing on the photoelectric conversion layer 204b. In FIG. 5, a graph plotted with a thick solid line represents exemplary current voltage characteristics (I-V characteristics) of the photoelectric conversion layer 204b in a state of being irradiated with the light. Note that FIG. 5 also illustrates an example of the I-V characteristics in a state of not being irradiated with the light by using a thick dashed line. FIG. 5 illustrates changes in current density between two principal surfaces of the photoelectric conversion layer 204b in a case of changing a bias voltage to be applied between the principal surfaces. In the present specification, a forward direction and a backward direction of the bias voltage will be defined as follows. As mentioned above, the photoelectric conversion layer 204b has the diode characteristic. In the case where the photoelectric conversion layer 204b has a junction structure of layered p-type semiconductor and layered n-type semiconductor, a bias voltage that brings an electric potential of the layer of the p-type semiconductor higher than an electric potential of the layer of the n-type semiconductor will be defined as a bias voltage in a forward direction. On the other hand, a bias voltage that brings the electric potential of the layer of the p-type semiconductor lower than the electric potential of the layer of the n-type semiconductor will be defined as a bias voltage in a backward direction. In the case of using the organic semiconductor materials, it is possible to define the forward direction and the backward direction in the same way as the case of using the inorganic semiconductor materials. In the case where the photoelectric conversion layer 204b has the bulk heterojunction structure, p-type semiconductor in an amount more than n-type semiconductor appears on one surface out of two principal surfaces of the bulk heterojunction structure opposed to an electrode while the n-type semiconductor in an amount more than the p-type semiconductor appears on the other surface thereof as schematically illustrated in FIG. 1 of Japanese Patent No. 5553727 mentioned above. Accordingly, a bias voltage with which the electric potential on the principal surface side where the p-type semiconductor appears more than the n-type semiconductor becomes higher than the electric potential on the principal surface side where the n-type semiconductor appears more than the p-type semiconductor will be defined as the bias voltage in the forward direction.

As illustrated in FIG. 5, the current voltage characteristics of the photoelectric conversion layer 204b are schematically characterized by three voltage ranges, namely, first to third voltage ranges. The first voltage range is a backward bias voltage range being a voltage range in which an absolute value of the output current density increases along with an increase in bias voltage in the backward direction. The first voltage region may also be referred to as a voltage range in which the electric current increases along with the increase in bias voltage to be applied between the principal surfaces of the photoelectric conversion layer 204b. The second voltage range is a forward bias voltage range being a voltage range in which the output current density increases along with an increase in bias voltage in the forward direction. In other words, the second voltage range is a voltage range in which a current in the forward direction increases along with the increase in bias voltage to be applied between the principal surfaces of the photoelectric conversion layer 204b. The third voltage range is a voltage range located between the first voltage range and the second voltage range.

The first voltage range to the third voltage range can be distinguished, respectively, depending on inclinations of the graphs of the current voltage characteristics in the case of using the linear vertical axis and the linear horizontal axis. For the purpose of reference, FIG. 5 indicates average inclinations of the graphs in the first voltage range and the second voltage range by using a dashed line L1 and a dashed line L2, respectively. An applied voltage at an intersection of the dashed line L1 and the horizontal axis where the output current density is zero is a boundary between the first voltage range and the third voltage range, while an applied voltage at an intersection of the dashed line L2 and the horizontal axis where the output current density is zero is a boundary between the third voltage range and the second voltage range. As illustrated in FIG. 5 as an example, rates of change of the output current density relative to the increase in bias voltage vary with one another in the first voltage range, the second voltage range, and the third voltage range. The third voltage range is defined as the voltage range in which the rate of change of the output current density relative to the bias voltage is smaller than the rate of change in the first voltage range and the rate of change in the second voltage range.

Here, regarding the third voltage range, the third voltage range may be determined based on a location of a rising edge or a falling edge in the graph representing the I-V characteristics. The third voltage range is typically larger than −1 V and smaller than +1 V. In the third voltage range, the current density between the principal surfaces of the photoelectric conversion layer 204b barely changes even when the bias voltage is changed. As illustrated in FIG. 5 as an example, in the third voltage range, the absolute value of the current density is typically smaller than or equal to 100 $\mu A/cm^2$.

(Charge Accumulating and Resetting Methods)

FIGS. 6A and 6B are diagrams illustrating an example of an energy band diagram of the photoelectric conversion unit 204. Specifically, FIGS. 6A and 6B illustrate an example of an energy band diagram of the photoelectric conversion unit 204 in the first voltage range and the second voltage range mentioned above. In terms of the vertical axis, a higher coordinate represents a higher energy level and represents a smaller electric potential of an electrode. As mentioned above, the electron affinity of the electron blocking layer 204e is smaller by at least 1.8 eV than the work function of the second electrode 203 and is smaller by not more than 1.6 eV than the electron affinity of the photoelectric conversion layer 204b. In other words, a LUMO level of the electron blocking layer 204e is higher by at least 1.8 eV than the work function of the second electrode 203 and is higher by not more than 1.6 eV than a LUMO level of the photoelectric conversion layer 204b. Meanwhile, the ionization potential of the electron blocking layer 204e is larger than the ionization potential of the photoelectric conversion layer 204b. In other words, a HOMO level of the electron blocking layer 204e is lower than a HOMO level of the photoelectric conversion layer 204b.

Using FIGS. 6A and 6B, a description will be given of the imaging device 100 of this embodiment at the time of the charge accumulating operation and at the time of the resetting operation. Here, the time of the charge accumulating operation means a period from a start to an end of accumulation of the signal charges degenerated by irradiating the photoelectric conversion layer 204b with the light. Note that the time of the charge accumulating operation represents an example of a first period to read and store the signal charges from the photoelectric conversion unit 204 into the charge accumulation region. On the other hand, the time of the resetting operation means a period for discharging the signal charges accumulated in the charge accumulation region and resetting the electric potential of the charge accumulation region to the electric potential prior to the charge accumulation. Note that the time of the resetting operation represents an example of a second period to reset the signal charges accumulated in the charge accumulation region. The following is an example of using holes out of pairs of electrons and holes as the signal charges.

First, concerning the time of the charge accumulating operation, the voltage VH higher than the voltage at the second electrode 203 is applied to the first electrode 202, thereby setting the photoelectric conversion layer 204b to a state in the first voltage range. That is, the voltage VH is the voltage within the first voltage range. FIG. 6A illustrates an energy band diagram of the photoelectric conversion unit 204 in this instance. When the light is made incident, the photoelectric conversion is performed by the photoelectric conversion layer 204b in photoelectric conversion unit 204 in accordance with a wavelength of the light and an amount of the light, and the pairs of electrons and holes are thus generated. Of the generated pairs of electrons and holes, the holes serving as the signal charges are attracted by the second electrode 203 in the state of the low voltage and are accumulated in the charge accumulation region. In this instance, the electrons serving as the minority charges are attracted by the first electrode 202 to which the voltage higher than that at the second electrode 203 is applied, and are released through not-illustrated wiring. As a consequence, the signal charges generated in the photoelectric conversion layer 204b at the time of the charge accumulating operation are accumulated in the charge accumulation region coupled to the second electrode 203, whereby the electric potential of the second electrode 203 is changed and a pixel signal is detected as a consequence of a change in voltage to be applied to the gate of the amplification transistor 206 that is electrically coupled to the second electrode 203. Here, the pixel signal detected by the amplification transistor 206 is selectively outputted to signal wiring by using the selection transistor 207.

Here, as illustrated FIG. 6A, the electron blocking layer 204e blocks migration of the electrons being the minority charges from the second electrode 203 to the photoelectric conversion layer 204b with an energy barrier larger than or equal to 1.8 eV. That is, the electron blocking layer 204e plays a role as a barrier against the migration of the electrons between the second electrode 203 and the photoelectric conversion layer 204b. In other words, it is possible to prevent the electrons from migrating from the second electrode 203 to the first electrode 202 and causing false signal charges (that is, noise).

Next, concerning the time of the resetting operation, the voltage VL lower than the voltage at the second electrode 203 is applied to the first electrode 202, thereby setting the photoelectric conversion layer 204b to a state in the second voltage range. That is, the voltage VL is the voltage within the second voltage range. FIG. 6B illustrates an energy band diagram of the photoelectric conversion unit 204 in this instance.

As illustrated in FIG. 6B, the energy barrier of the electron blocking layer 204e against the migration of the electrons serving as the minority charges from the photoelectric conversion layer 204b to the second electrode 203 is smaller than or equal to 1.6 eV. Accordingly, of the pairs of electrons and holes generated by the photoelectric conversion in the photoelectric conversion layer 204b of the photoelectric conversion unit 204, the electrons serving as the minority signal charges are attracted by the second electrode 203 in the state of the high voltage while being barely blocked by the electron blocking layer 204e and are accumulated in the charge accumulation region. In the charge accumulation region, the electrons flowing in are recombined with the holes accumulated as the signal charges, whereby the electric potential of the second electrode declines to a reset potential. Thus, the electric potential at the portion where the second electrode 203 is electrically coupled to the gate of the amplification transistor 206, that is, the charge accumulation region is reset. In the meantime, the holes are attracted by the first electrode 202 to which the voltage lower than that of the second electrode 203 is applied, and are released through the not-illustrated wiring. As a consequence, it is possible to release all the signal charges accumulated in the portion from the second electrode 203 to the gate of the amplification transistor 206, that is, the signal charges accumulated in the charge accumulation region to the voltage supply circuit 201 side.

As described above, it is possible to switch between the charge accumulating operation and the resetting operation by controlling the voltage to be applied to the first electrode 202. In this instance, the electron blocking layer 204e blocks the migration of the minority charges from the charge accumulation region that is coupled to the second electrode 203 to the photoelectric conversion layer 204b at the time of the charge accumulating operation, and barely blocks the migration of the minority charges from the photoelectric conversion layer 204b to the charge accumulation region at the time of the resetting operation. In this way, a reset transistor conventionally required by each pixel is no longer necessary. In addition, a dark current attributed to the migration of the minority charges from the charge accumulation region to the photoelectric conversion layer at the time of the charge accumulating operation is reliably suppressed, and the migration of the minority charges from the photoelectric conversion layer to the charge accumulation region is carried out smoothly at the time of the resetting operation.

Note that the charge accumulation region of this embodiment may also be deprived of the charge accumulation unit 205 as provided in the conventional imaging device for accumulating the signal charges. In other words, a high-density impurity region does not have to be formed as the charge accumulation region in the substrate because the floating capacitance existing in the region from the second electrode 203 to the gate of the amplification transistor 206 functions as the charge accumulation region. The above-described structure can prevent an effect of the dark current attributed to the high-density impurity region during an accumulation period of the signal charges.

(Driving Method)

Figure 7:
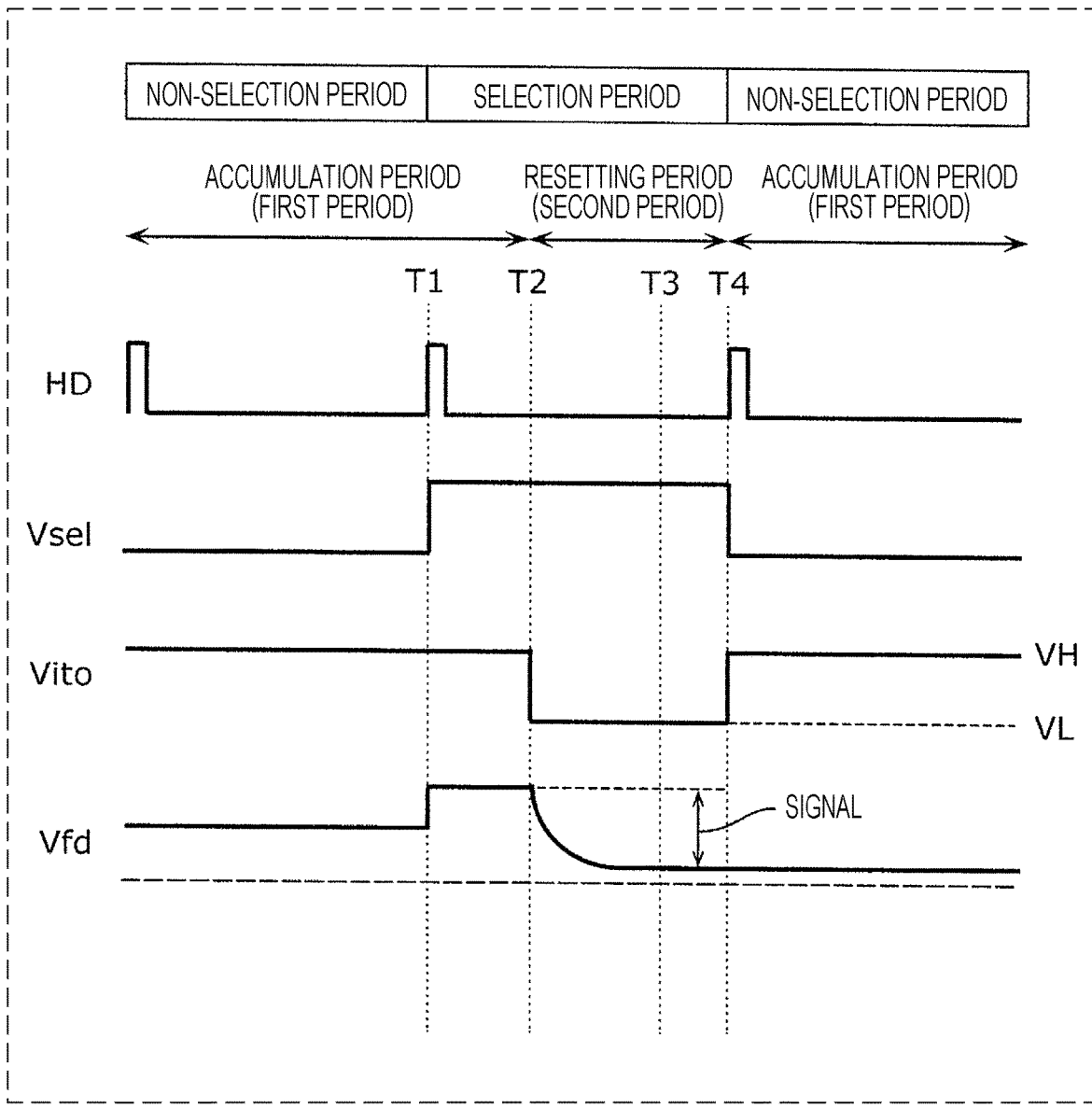
FIG. 7 is a timing chart of control signals at a pixel of the imaging device according to Embodiment 1 of the present disclosure.

FIG. 7 is a timing chart of control signals at a pixel of the imaging device 100 according to Embodiment 1. A method of driving the imaging device 100 is illustrated herein. FIG. 7 illustrates, from top to bottom, a synchronization signal HD in a pixel horizontal direction, a selection signal Vsel to control a state of conduction of the selection transistor 207, a control signal Vito for the voltage supply circuit 201 to be applied to the first electrode 202, and a voltage level Vfd of the charge accumulation unit 205.

A reading operation of pixel signals on a selected row, the resetting operation, and a reading operation of a reset signal are carried out in 1H (a selection period) from time T1 to time T4.

First, the value Vsel is set to a high voltage at the time T1 and the voltage at the charge accumulation unit 205 of each pixel on the selected row is read out as the pixel signal to the vertical signal line 208 through the amplification transistor 206 and the selection transistor 207. Thereafter, the value Vsel is kept at the high voltage during the selection period. Here, an accumulation period from the time T4 to the time T2 represents an example of a first period to read the signal charges from the photoelectric conversion unit 204 to the charge accumulation region. An operation in this first period corresponds to a first step of supplying the voltage VH representing a first voltage to the first electrode 202.

Next, when the value Vito transitions from a high voltage to a low voltage at the time T2, the minority charges that are opposite charges to the signal charges are infused into the charge accumulation unit 205 through the photoelectric conversion layer 204b and the minority charges are recombined with the signal charges accumulated in the charge accumulation unit 205, whereby the voltage level of the charge accumulation unit 205 is reset to the voltage VL.

Subsequently, the value Vfd is set to the low voltage at the time T3 and a reset level is read out during a period from the time T3 to the time T4.

After the value Vsel is set to the low voltage at the time T4 and the selection transistor 207 is set to an off state, the value Vito is set to the high voltage to start the accumulation of the signals. This processing is repeated thereafter. Here, a resetting period from the time T2 to the time T4 represents an example of a second period to reset the signal charges accumulated in the charge accumulation region. An operation in this second period corresponds to a second step of supplying the voltage VL that represents a second voltage being different from the first voltage to the first electrode 202.

As described above, the imaging device 100 according to this embodiment can read out the signals by adopting the pixel configuration that is deprived of the reset transistor, thereby miniaturizing the pixels in the imaging device 100. Moreover, the photoelectric conversion unit 204 includes the electron blocking layer 204e that blocks the migration of the minority charges from the charge accumulation region to the photoelectric conversion layer 204b at the time of the charge accumulating operation. Accordingly, a dark current on each pixel is reduced. Furthermore, the migration of the minority charges from the photoelectric conversion layer 204b to the charge accumulation region is carried out smoothly at the time of the resetting operation.

Figure 8A:
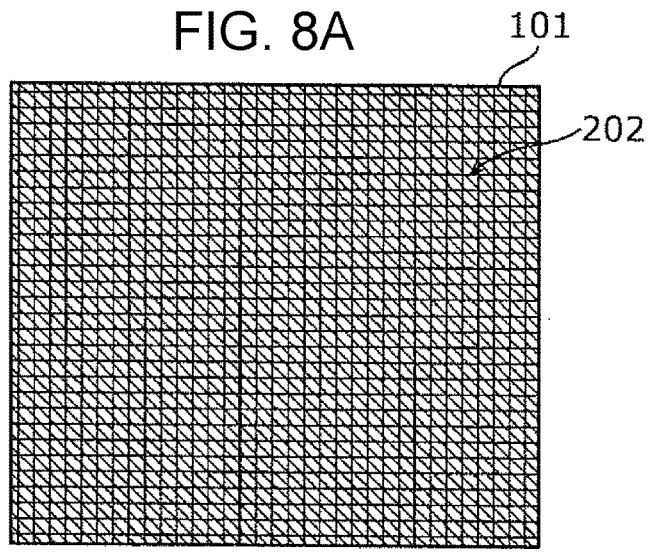
FIG. 8A is a plan view of a first electrode in a pixel array unit of the imaging device according to Embodiment 1 of the present disclosure.
Figure 8B:
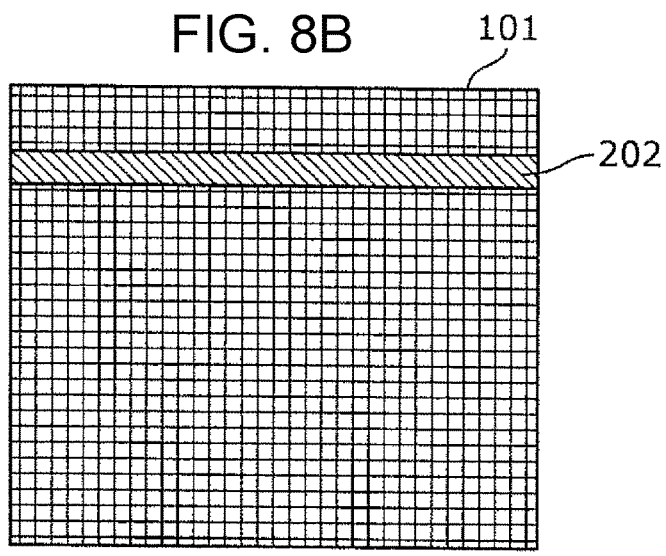
FIG. 8B is a plan view of a first electrode in a pixel array unit of an imaging device according to Modified Example 1 of the present disclosure.
Figure 8C:
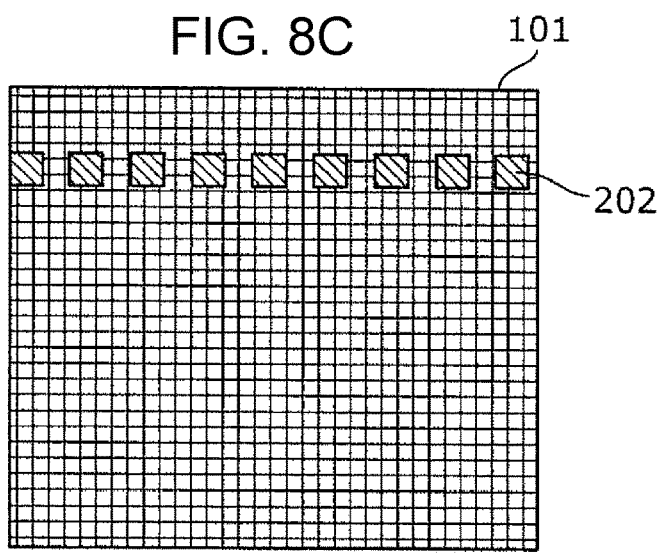
FIG. 8C is a plan view of first electrodes in a pixel array unit of an imaging device according to Modified Example 2 of the present disclosure.

FIGS. 8A to 8C are plan views of the first electrode 202 in an imaging region of each of the imaging devices according to Embodiment 1 and modified examples. Note that the imaging region is a region corresponding to the pixel array unit 101 in FIG. 1. Meanwhile, hatched portions in FIGS. 8A to 8C represent the first electrodes 202. FIG. 8A is the plan view of the first electrode 202 in the imaging region of the imaging device 100 according to this embodiment. As illustrated in FIG. 8A, in this embodiment, the first electrode 202 is formed into such a size that covers the imaging region, and is formed in common across all the pixels. That is, the first electrode 202 is formed continuously across the multiple pixels. This makes it possible to control a supply voltage to the first electrode 202 across all the pixels at the same time, and to carry out a global resetting operation to reset all the pixels at the same time.

On the other hand, as modified examples of the first electrode 202, the electrodes may be formed on each of the pixels, formed for each row of the pixels, or formed in such a way as to be shared by the pixels. Modified Example 1 and Modified Example 2 each obtained by modifying the configuration of the first electrodes 202 will be described below.

Modified Example 1

FIG. 8B is the plan view of the first electrode 202 in the imaging region according to Modified Example 1. Note that only a part of the first electrodes 202 is illustrated in FIG. 8B. Modified Example 1 is obtained by changing only the configuration of the first electrodes 202 of the Embodiment 1.

As illustrated in FIG. 8B, the first electrode 202 is formed for each row of the pixels in Modified Example 1. Specifically, the first electrode 202 is formed continuously across the pixels located on the same row out of the multiple pixels. The above-mentioned first electrodes 202 are formed by providing an electrode material on the hole blocking layer 204h and then patterning the electrode material.

In the structure of Modified Example 1, the independent voltage supply circuit 201 is provided to every first electrode 202 formed on each row, so that the supply voltage to the first electrodes 202 can be controlled on the row basis. Moreover, since the first electrodes 202 can be controlled individually on the row basis, Modified Example 1 has an advantageous effect of enabling adjustment of sensitivity on the row basis.

Modified Example 2

FIG. 8C is the plan view of the first electrodes 202 in the imaging region according to Modified Example 2. Note that only a part of the first electrodes 202 is illustrated in FIG. 8C. Modified Example 2 is obtained by changing only the configuration of the first electrodes 202 of the Embodiment 1.

As illustrated in FIG. 8C, the first electrode 202 is formed for each of the pixels in Modified Example 2. Specifically, the first electrodes 202 are formed separately on the respective pixels. The above-mentioned first electrodes 202 are formed by providing an electrode material on the hole blocking layer 204h and then patterning the electrode material.

In the structure of Modified Example 2, the independent voltage supply circuit 201 is coupled to the first electrode 202 formed for each pixel, so that the supply voltage to the first electrodes 202 can be controlled on the pixel basis. Moreover, since the first electrodes 202 can be controlled individually on the pixel basis, Modified Example 2 has an advantageous effect of enabling adjustment of sensitivity on the pixel basis.

Embodiment 2

Next, Embodiment 2 concerning the present disclosure will be described by using FIG. 9. Note that a block diagram of the imaging device 100 according to Embodiment 2 is the same as FIG. 1 illustrated in conjunction with Embodiment 1. Moreover, the structure of each pixel and the structure of the photoelectric conversion unit are also the same as FIGS. 2 and 4 illustrated in conjunction with Embodiment 1.

Figure 9:
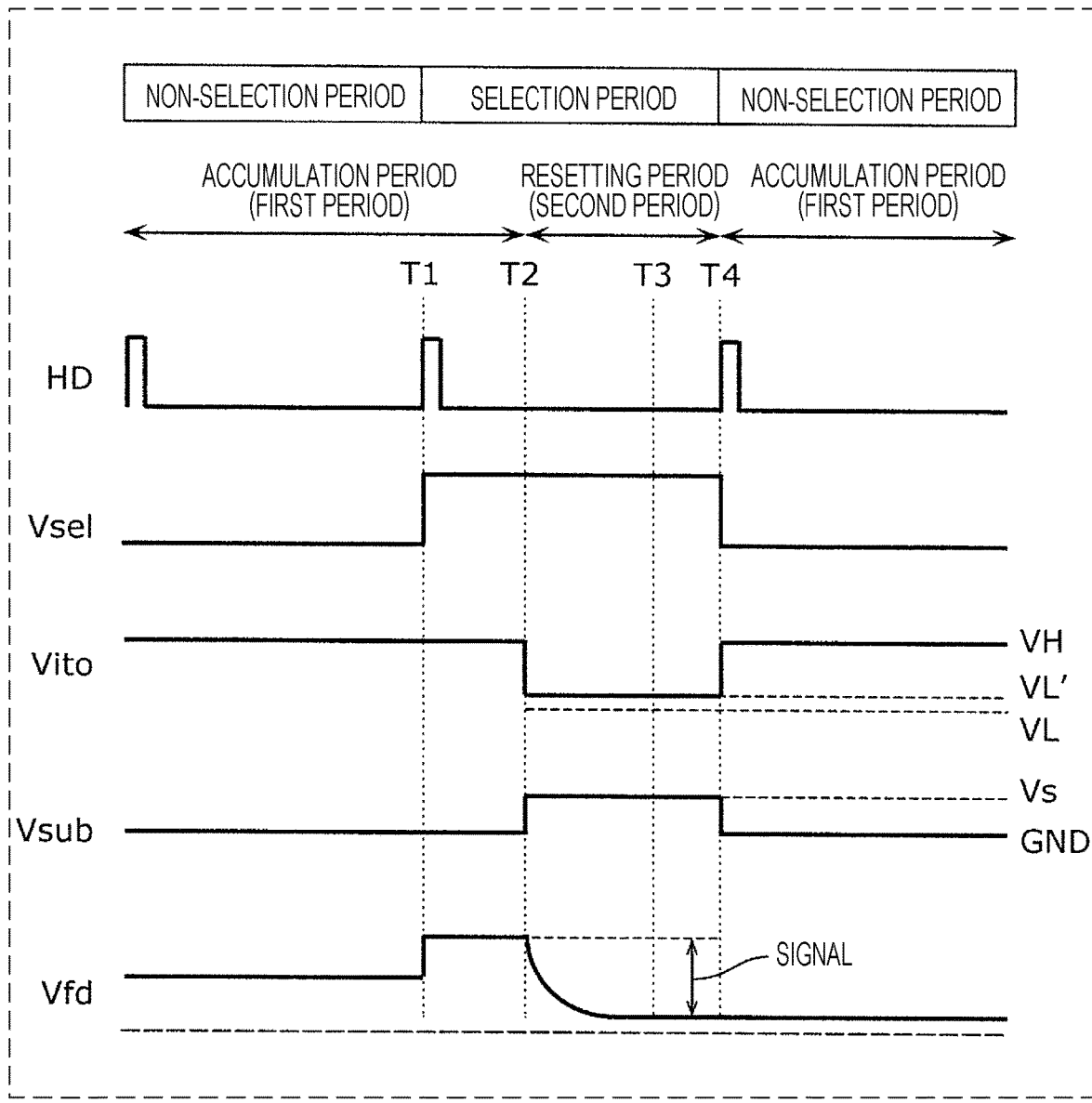
FIG. 9 is a timing chart of control signals at a pixel of an imaging device according to Embodiment 2 of the present disclosure.

FIG. 9 is a timing chart of control signals at a pixel of the imaging device according to Embodiment 2. FIG. 9 illustrates, from top to bottom, the synchronization signal HD in the pixel horizontal direction, the selection signal Vsel to control the state of conduction of the selection transistor 207, the control signal Vito for the voltage supply circuit 201 to be applied to the first electrode 202, an electric potential Vsub to be applied to the substrate 309, and the voltage level Vfd of the charge accumulation unit 205.

The reading operation of the pixel signals on the selected row, the resetting operation, and the reading operation of the reset signal are carried out in 1H (the selection period) from the time T1 to the time T4. Now, a description will be given below only of different features from the operation timing chart illustrated in FIG. 7.

Note that the electric potential Vsub applied to the substrate 309 in the first period, being accumulation period from the time T4 to the time T2, represents an example of a third voltage to be supplied to the substrate 309 in the first period. The third voltage is smaller than the voltage VH that is the first voltage to be supplied to the first electrode 202. The third voltage is a ground potential GND in this embodiment.

When the value Vito transitions from the high voltage to the low voltage at the time T2, the minority charges that are the opposite charges to the signal charges are infused into the charge accumulation unit 205 through the photoelectric conversion layer 204b and the minority charges are recombined with the signal charges accumulated in the charge accumulation unit 205, whereby the voltage level of the charge accumulation unit 205 is reset to the voltage VL. Here, it is advantageous when it is possible to reduce the range of the voltage Vito. To this end, an alteration of the electric potential Vsub to be applied to the substrate 309 is taken into consideration. Specifically, at the time T2, the substrate electric potential Vsub is raised from the ordinary ground potential GND to a voltage Vs in a positive direction. The voltage Vs represents an example of a fourth voltage to be supplied to the substrate 309 in the second period being the resetting period. The fourth voltage is larger than the voltage VL being the second voltage. The voltage Vs is 2 V, for example. As a consequence, it is possible to raise the low voltage Vito accordingly so that the signal charges can be reset at a voltage VL' (=VL+Vs).

The value Vfd is completely set to the low voltage at the time T3 and a reset level is read out during a period from the time T3 to the time T4.

At the time T4, the value Vsel is set to the low voltage and the selection transistor 207 is set to the off state. At the same time, the value Vito is set to the high voltage to start the accumulation of the signals. Then, the value Vsub is brought back to the ground potential GND. Thereafter, the processing is processing likewise.

As described above, according to this embodiment, it is possible to reduce the voltage range of the control signal Vito for the voltage supply circuit 201 to be applied to the first electrode 202 and to reduce a constraint on a power supply circuit in the imaging device 100. Meanwhile, in Embodiment 1, the voltage supply circuit 201 applies the voltage at 8 V to the first electrode 202 at the time of charge accumulation and applies the voltage at −2 V thereto at the time of resetting, for instance. In other words, the polarity of the voltage to be applied to the first electrode 202 at the time of charge accumulation is different from the polarity of the voltage to be applied thereto at the time of resetting. In this case, two power supply systems having different polarities are required. However, in Embodiment 2, the voltage supply circuit 201 applies the voltage at 8 V to the first electrode 202 at the time of charge accumulation and applies the voltage at 2 V thereto at the time of resetting, for instance. In other words, the polarity of the voltage to be applied to the first electrode 202 at the time of charge accumulation is the same as the polarity of the voltage to be applied thereto at the time of resetting. In this case, the voltage supply circuit 201 only needs to have one power supply system. Hence, according to Embodiment 2, it is possible to reduce a circuit scale of the imaging device 100 as compared to Embodiment 1.

The imaging devices according to Embodiments 1 and 2 as well as the modified examples have been described above. It is to be noted, however, that the present disclosure is not limited only to these Embodiments 1 and 2 as well as the modified examples. For instance, the voltage supply circuit 201 can also be controlled at a higher degree of freedom by further using control signals from the outside of the chip.

Meanwhile, each pixel 200 in the imaging device 100 according to Embodiments described above is the pixel that adopts the holes as the signal charges. Instead, such a pixel may adopt the electrons as the signal charges.

Figure 10:
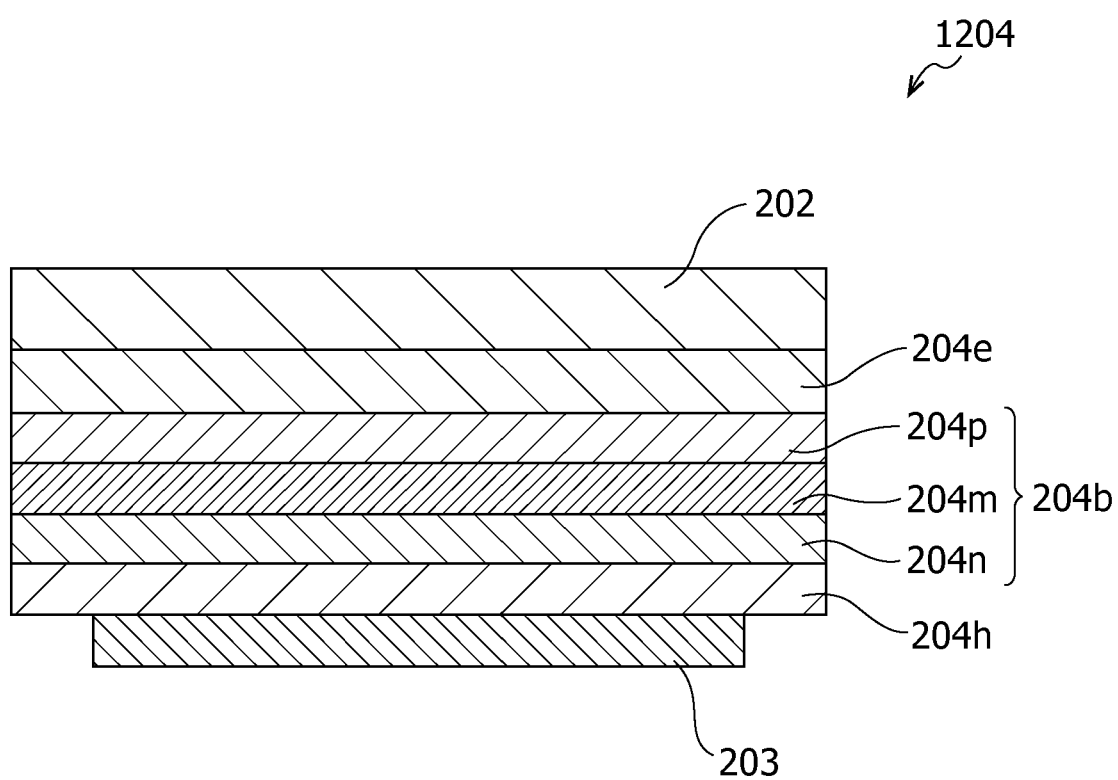
FIG. 10 is a diagram schematically illustrating an example of a configuration of a photoelectric conversion unit of an imaging device according to a different embodiment of the present disclosure, which includes pixels that use electrons as signal charges.

FIG. 10 is a diagram schematically illustrating an example of a structure of a photoelectric conversion unit 1204 of an imaging device according to a different embodiment of the present disclosure provided with pixels adopting the electrons as the signal charges. Locations of the hole blocking layer 204h and the electron blocking layer 204e are interchanged in comparison with Embodiment 1 illustrated in FIG. 4.

Note that in this example, the ionization potential of the hole blocking layer 204h is larger by at least 1.8 eV than the work function of the second electrode 203 and is larger by not more than 1.6 eV than the ionization potential of the photoelectric conversion layer 204b. Meanwhile, the electron affinity of the hole blocking layer 204h is smaller than the electron affinity of the photoelectric conversion layer 204b.

FIGS. 11A and 11B are diagrams illustrating an example of an energy band diagram of a photoelectric conversion unit of the imaging device according to the different embodiment of the present disclosure provided with pixels adopting the electrons as the signal charges. In the imaging device of this type, the first voltage to be applied to the first electrode 202 at the time of the charge accumulating operation being the first period is smaller than the second voltage to be applied to the first electrode 202 at the time of the resetting operation being the second period. Moreover, as mentioned above, the ionization potential of the hole blocking layer 204h is larger by at least 1.8 eV than the work function of the second electrode 203 and is larger by not more than 1.6 eV than the ionization potential of the photoelectric conversion layer 204b. In other words, a HOMO level of the hole blocking layer 204h is lower by at least 1.8 eV than the work function of the second electrode 203 and is lower by not more than 1.6 eV than the HOMO level of the photoelectric conversion layer 204b. Meanwhile, the electron affinity of the hole blocking layer 204h is smaller than the electron affinity of the photoelectric conversion layer 204b. In other words, a LUMO level of the hole blocking layer 204h is higher than the LUMO level of the photoelectric conversion layer 204b.

Moreover, as illustrated in FIG. 11A that represents the energy band diagram at the time of the charge accumulating operation, since the ionization potential of the hole blocking layer 204h is larger by at least 1.8 eV than the work function of the second electrode 203, the hole blocking layer 204h blocks migration of the holes being the minority charges from the second electrode 203 to the photoelectric conversion layer 204b with an energy barrier larger than or equal to 1.8 eV. In this way, it is possible to prevent the holes from migrating from the second electrode 203 side to the first electrode 202 side and causing false signal charges, that is, the noise.

Meanwhile, as illustrated in FIG. 11B that represents the energy band diagram at the time of the resetting operation, since the ionization potential of the hole blocking layer 204h is larger by not more than 1.6 eV than the ionization potential of the photoelectric conversion layer 204b, an energy barrier of the hole blocking layer 204h against the migration of the holes serving as the minority charges from the photoelectric conversion layer 204b to the second electrode 203 is smaller than or equal to 1.6 eV. Accordingly, of the pairs of electrons and holes generated by the photoelectric conversion in the photoelectric conversion layer 204b of the photoelectric conversion unit 204, the holes serving as the minority signal charges are attracted by the second electrode 203 in the state of the low voltage while being barely blocked by the hole blocking layer 204h and are accumulated in the charge accumulation region, thus resetting the charge accumulation region.

As described above, the hole blocking layer 204h blocks the migration of the minority charges from the charge accumulation region that is coupled to the second electrode 203 to the photoelectric conversion layer 204b at the time of the charge accumulating operation, and barely blocks the migration of the minority charges from the photoelectric conversion layer 204b to the charge accumulation region at the time of the resetting operation. In this way, a reset transistor conventionally required by each pixel is no longer necessary. In addition, a dark current attributed to the migration of the minority charges from the charge accumulation region to the photoelectric conversion layer at the time of the charge accumulating operation is reliably suppressed, and the migration of the minority charges from the photoelectric conversion layer to the charge accumulation region is carried out smoothly at the time of the resetting operation.

In the meantime, the electric potential of the substrate 309 in the imaging device provided with the pixels adopting the electrons as the signal charges may also be controlled as described above in conjunction with Embodiment 2. Specifically, a fifth voltage is applied to the substrate 309 in the first period being the time of the charge accumulation region, and a sixth voltage that is different from the fifth voltage is applied to the substrate 309 in the second period being the time of the resetting operation. In this instance, the fifth voltage is larger than the first voltage to be supplied to the first electrode 202 at the time of the charge accumulating operation and the sixth voltage is smaller than the second voltage to be supplied to the first electrode 202 at the time of the resetting operation. In this way, it is possible to reduce the voltage range of the control signal Vito for the voltage supply circuit 201 to be applied to the first electrode 202 and to reduce the constraint on the power supply circuit in the imaging device as with Embodiment 2 described above.

Figure 12:
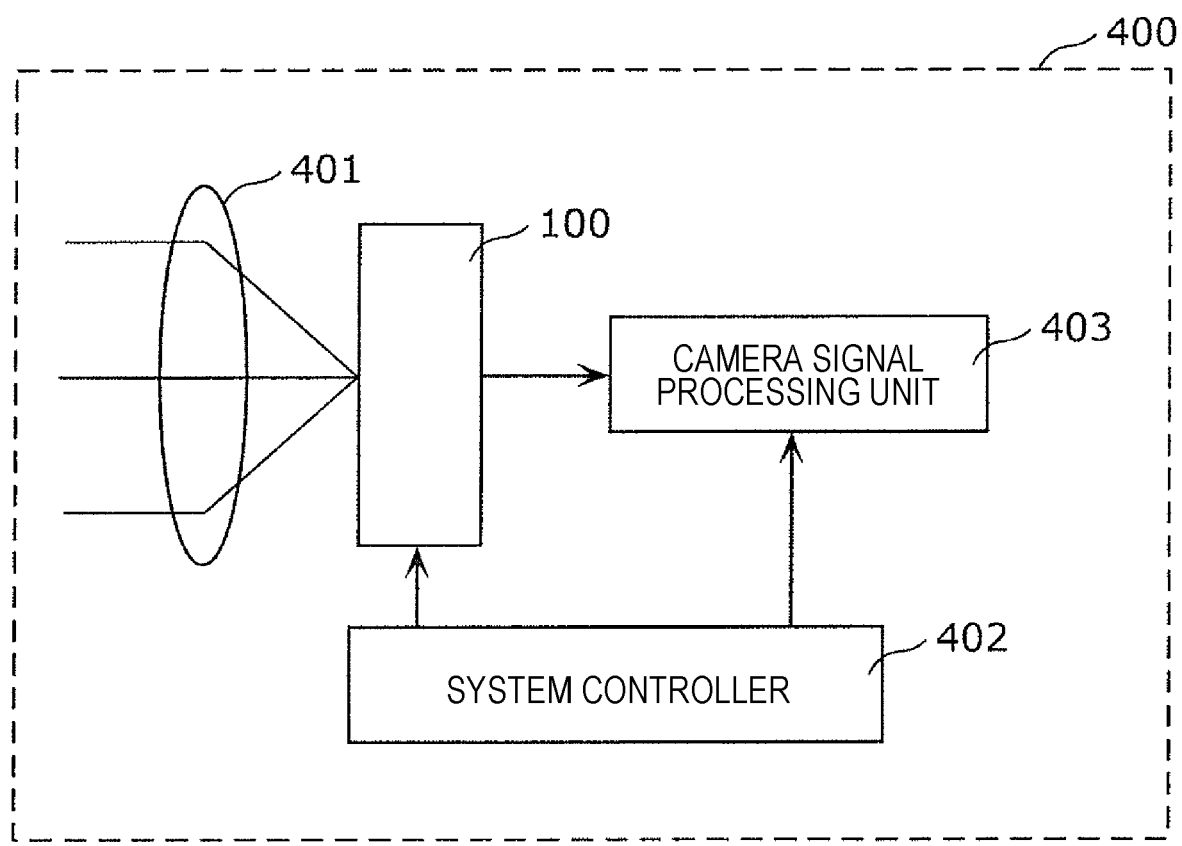
FIG. 12 is a block diagram illustrating a configuration example of a camera system including the imaging device according to the present disclosure.

On the other hand, the imaging devices according to the embodiments and the modified examples described above may also be applied to a camera system 400 as illustrated in a block diagram of FIG. 12. FIG. 12 is a block diagram illustrating a configuration example of the camera system 400 including the imaging device 100 according to the present disclosure. The camera system 400 includes a lens optical system 401, the imaging device 100, a system controller 402, and a camera signal processing unit 403. The lens optical system 401 includes an automatic focusing lens, a zoom lens, and a diaphragm, for example. The lens optical system 401 collects the light onto an imaging surface of the imaging device 100. The system controller 402 can be implemented by using a microcomputer, for example. The camera signal processing unit 403 functions as a signal processing circuit that outputs either an image or data by subjecting data imaged with the imaging device 100 to signal processing. The camera signal processing unit 403 performs processing such as gamma correction, color interpolation processing, spatial interpolation processing, and white balancing. The camera signal processing unit 403 can be implemented by using a DSP (digital signal processor), for example. The above-mentioned camera system 400 includes the imaging device 100 which is capable of achieving a low dark current and miniaturization of the pixels, and can therefore be realized as a compact camera with high image quality.

Meanwhile, the respective processing units included in the imaging device 100 according to any of the above-described embodiments are typically realized in the form of an LSI which is an integrated circuit. Each of these units may be formed into one chip, or part or all of the units may be combined into one chip.

In the meantime, formation of the integrated circuit is not limited only to adoption of the LSI but may also be realized in the form of a discrete circuit or a general-purpose processor. An FPGA (field programmable gate array) that can be programmed after manufacturing an LSI, or a reconfigurable processor which can reconfigure coupling and setting of circuit cells inside an LSI may also be used.

Meanwhile, in the cross-sectional views mentioned above, corners and sides of the respective constituents are illustrated with straight lines. However, the corners and the sides that are slightly rounded due to manufacturing reasons are also included in the present disclosure.

In the meantime, at least part of the functions of the imaging devices according the embodiments and the modified examples thereof may be combined.

Meanwhile, the numerical values used above are mere examples for specifically describing the present disclosure, and the present disclosure is not limited to the numerical values represented as the examples. In addition, the logic levels indicated by high/low or the switching states indicated by on/off are mere examples for specifically describing the present disclosure, and similar results can also be obtained by combinations of the logic levels or the switching states which are different from those represented as the examples. Meanwhile, the n-type, the p-type, and the like of transistors and others are mere examples for specifically describing the present disclosure, and similar effects can also be obtained by inverting these polarities. In the meantime, the materials of the respective constituents cited above are mere examples for specifically describing the present disclosure, and the present disclosure is not limited only to the materials represented as the examples. Meanwhile, the coupling relations among the constituents are mere examples for specifically describing the present disclosure, and the coupling relations for implementing the functions of the present disclosure are not limited only to these relations.

In the meantime, although the example of using the MOS transistor has been described above, other transistors may be used instead.

In addition, the present disclosure also encompasses various other modified examples obtained by subjecting any of the embodiments of the present disclosure to modifications within a range conceivable by those skilled in the art unless such modifications do not deviate from the scope of the present disclosure.

An imaging device according to the present disclosure is applicable not only to house hold appliances such as digital still cameras and mobile telephones, but also to image sensors in multiple areas including in-vehicle, mobile, medical, and other products.

What is claimed is:

1. An imaging device comprising:
   one or more pixels, each of the one or more pixels including
   a photoelectric converter including
   a first electrode,
   a second electrode,
   a photoelectric conversion layer that is located between the first electrode and the second electrode, and that converts incident light into a signal charge, and
   a blocking layer that is located between the photoelectric conversion layer and the second electrode; and
   a charge accumulation region that is coupled to the second electrode, and that accumulates the signal charge, wherein:
   an energy barrier of the blocking layer against migration of a charge having an opposite polarity to a polarity of the signal charge from the second electrode to the photoelectric conversion layer is larger than or equal to 1.8 eV,
   in a case where the charge can move in the photoelectric conversion layer, an energy barrier of the blocking layer against migration of the charge from the photoelectric conversion layer to the second electrode is smaller than or equal to 1.6 eV,
   the signal charge is a hole,
   an electron affinity of the blocking layer is smaller than a work function of the second electrode and a difference between the electron affinity of the blocking layer and the work function of the second electrode is larger than or equal to 1.8 eV,
   the electron affinity of the blocking layer is smaller than an electron affinity of the photoelectric conversion layer and a difference between the electron affinity of the blocking layer and the electron affinity of the photoelectric conversion layer is smaller than or equal to 1.6 eV, and
   an ionization potential of the blocking layer is larger than an ionization potential of the photoelectric conversion layer.

2. The imaging device according to claim 1, further comprising:
   a voltage supply circuit, wherein
   the voltage supply circuit
   supplies a first voltage to the first electrode in a first period to accumulate the signal charge from the photoelectric converter in the charge accumulation region, and
   supplies a second voltage being different from the first voltage to the first electrode in a second period to reset the signal charge accumulated in the charge accumulation region.

3. The imaging device according to claim 1, further comprising:
   a voltage supply circuit, wherein
   the voltage supply circuit
   supplies a first voltage to the first electrode in a first period to accumulate the signal charge from the photoelectric converter in the charge accumulation region, and
   supplies a second voltage being smaller than the first voltage to the first electrode in a second period to reset the signal charge accumulated in the charge accumulation region.

4. The imaging device according to claim 3, further comprising:
   a semiconductor substrate provided with the charge accumulation region, wherein
   a third voltage is supplied to the semiconductor substrate in the first period, and
   a fourth voltage being different from the third voltage is supplied to the semiconductor substrate in the second period.

5. The imaging device according to claim 4, wherein
   the third voltage is smaller than the first voltage, and
   the fourth voltage is larger than the second voltage.

6. The imaging device according to claim 2, wherein
   the photoelectric conversion layer has a diode characteristic,
   the photoelectric converter has a current voltage characteristic including
   a first voltage range in which an absolute value of an output current density from the photoelectric converter increases along with an increase in a bias voltage to be applied to the photoelectric conversion layer in a backward direction of the diode characteristic,
   a second voltage range in which the output current density increases along with an increase in the bias voltage in a forward direction of the diode characteristic, and
   a third voltage range located between the first voltage range and the second voltage range, an absolute value of a rate of change of the output current density relative to the bias voltage in the third voltage range being smaller than the absolute values of the rates of change in the first voltage range and the second voltage range,
   the bias voltage to be applied to the photoelectric conversion layer by supplying the first voltage to the first electrode falls within the first voltage range, and
   the bias voltage to be applied to the photoelectric conversion layer by supplying the second voltage to the first electrode falls within the second voltage range.

7. The imaging device according to claim 1, wherein
   the one or more pixels include a plurality of pixels arranged in a matrix, and
   the first electrode of each of the plurality of pixels is continuous to each other.

8. The imaging device according to claim 1, wherein
   the one or more pixels include a plurality of pixels arranged in a matrix, and
   the first electrode of each of the plurality of pixels located in a same row is continuous to each other.

9. The imaging device according to claim 1, wherein
   the one or more pixels include a plurality of pixels arranged in a matrix, and
   the first electrode of one of the plurality of pixels is separated from the first electrode of another one of the plurality of pixels.

10. The imaging device according to claim 1, further comprising:
    a semiconductor substrate, wherein
    each of the one or more pixels includes an amplification transistor including a gate coupled to the second electrode, the charge accumulation region includes the gate, and
the gate is not coupled to the semiconductor substrate.

\* \* \* \* \*